United States Patent
Montoya et al.

(10) Patent No.: US 12,517,135 B2
(45) Date of Patent: Jan. 6, 2026

(54) METHOD FOR MEASURING SYSTEMIC CHRONIC INFLAMMAGING

(71) Applicant: Edifice Health, Inc., San Mateo, CA (US)

(72) Inventors: Jose G. Montoya, San Mateo, CA (US); Mark M. Davis, Atherton, CA (US); David Furman, San Mateo, CA (US)

(73) Assignee: Edifice Health, Inc., San Mateo, CA (US)

( * ) Notice: Subject to any disclaimer, the term of this patent is extended or adjusted under 35 U.S.C. 154(b) by 81 days.

(21) Appl. No.: 16/970,796

(22) PCT Filed: Feb. 21, 2019

(86) PCT No.: PCT/US2019/019047
§ 371 (c)(1),
(2) Date: Aug. 18, 2020

(87) PCT Pub. No.: WO2019/165145
PCT Pub. Date: Aug. 29, 2019

(65) Prior Publication Data
US 2021/0109109 A1    Apr. 15, 2021

Related U.S. Application Data

(60) Provisional application No. 62/633,539, filed on Feb. 21, 2018.

(51) Int. Cl.
*G01N 33/68* (2006.01)
*G01N 33/74* (2006.01)

(52) U.S. Cl.
CPC ..... *G01N 33/6866* (2013.01); *G01N 33/6869* (2013.01); *G01N 33/74* (2013.01); *G01N 2333/523* (2013.01); *G01N 2333/5406* (2013.01); *G01N 2333/5409* (2013.01); *G01N 2333/5415* (2013.01); *G01N 2333/545* (2013.01); *G01N 2333/55* (2013.01); *G01N 2333/56* (2013.01); *G01N 2333/57* (2013.01); *G01N 2333/575* (2013.01); *G01N 2333/70575* (2013.01); *G01N 2800/7095* (2013.01)

(58) Field of Classification Search
None
See application file for complete search history.

(56) References Cited

U.S. PATENT DOCUMENTS

| | | |
|---|---|---|
| 2009/0042817 A1 | 2/2009 | Heger et al. |
| 2009/0274660 A1 | 11/2009 | Girsh |
| 2010/0124756 A1* | 5/2010 | Ray ............ G01N 33/6896 435/287.9 |
| 2012/0021414 A1 | 1/2012 | Shen-Orr et al. |
| 2012/0122717 A1 | 5/2012 | Satyaraj et al. |
| 2012/0134929 A1 | 5/2012 | McGrath et al. |
| 2015/0126408 A1 | 5/2015 | Link et al. |
| 2016/0000936 A1 | 1/2016 | Cuff |
| 2017/0189447 A1 | 7/2017 | Morris |
| 2017/0234873 A1 | 8/2017 | Oved |
| 2017/0249445 A1 | 8/2017 | Devries et al. |
| 2019/0024091 A1 | 1/2019 | Wyss-Coray et al. |
| 2019/0241669 A1 | 8/2019 | Kuo et al. |

FOREIGN PATENT DOCUMENTS

| | | |
|---|---|---|
| WO | WO 2005/123101 | 12/2005 |
| WO | WO 2019/165145 | 8/2019 |
| WO | WO 2019/178296 | 9/2019 |

OTHER PUBLICATIONS

Waiker et al (J Am Soc Nephrol. Jan. 2012; 23(1): 13-21) (Year: 2012).*
Mayeux (NeuroRx. Apr. 2004; 1(2):182-8) (Year: 2004).*
Fulop, Clin Rev Allergy Immunol. Sep. 18, 2021; see abstract (Year: 2021).*
Liu (Nat Immunol. Oct. 18, 2017;18(11):1175-1180) (Year: 2017).*
Bandeen-Roche et al., Measuring systemic inflammatory regulation in older adults: evidence and utility, 2009, Rejuven. Res. vol. 12, pp. 403-410.
Sainaghi, P.P., et al., "The expression pattern of inflammatory mediators in cerebrospinal fluid differentiates Guillain-Barre syndrome from chronic inflammatory demyelinating polyneuropathy", Cytokine, Academic Press Ltd, Philadelphia, PA, US, vol. 51, No. 2, Aug. 1, 2010 (Aug. 1, 2010), pp. 138-143.
Cong, Xiuli et al., "Immune system and Aging", Chinese Aesthetic Medicine, Jan. 2017, vol. 26, No. 1 Issue, pp. 16-20.
Huang, Jianhua et al., "Stress is an important cause of the formation of aging-related chronic low-grade inflammation", Practical Geriatrics, Feb. 2014, vol. 28, Issue 2, pp. 92-96.

* cited by examiner

*Primary Examiner* — Brian Gangle
*Assistant Examiner* — Andrea K McCollum
(74) *Attorney, Agent, or Firm* — Greenberg Traurig, LLP

(57) ABSTRACT

Provided herein is a method for measuring the levels of chronic inflammaging (SCI) of a subject. In some embodiments, the method may comprise measuring the amount of two or more of the proteins C-X-C motif ligand 9 (CXCL9), TNF-related apoptosis-inducing ligand (TRAIL), interferon gamma (IFNG), eosinophil chemotactic protein (EOTAXIN) and growth-regulated alpha protein (GROA) in a sample (e.g., blood serum) from the subject calculating a score based on the weighted amounts of each of those proteins.

19 Claims, 22 Drawing Sheets

Cell Subpopulations

| Feature | Distr type |
|---|---|
| B cells | Laplace |
| CD4+ T cells | Normal |
| CD8+ T cells | Normal |
| HLADR+ CD38+ CD4+ T cells | Log-normal |
| HLADR+ CD38+ CD4+ T cells | Log-normal |
| IgG+ CD27+ B cells | Laplace |
| IgG+ CD27- B cells | Laplace |
| IgG- CD27+ B cells | Laplace |
| IgG- CD27- B cells | Laplace |
| NK cells | Laplace |
| NKT cells | Laplace |
| T cells | Log-gamma |
| T regs | Log-normal |
| CM CD4+ T cells | Laplace |
| CM CD8+ T cells | Laplace |
| Effector CD4+ T cells | Gamma |
| Effector CD8+ T cells | Gamma |
| EM CD4+ T cells | Gamma |
| EM CD8+ T cells | Laplace |
| Total Lymphocytes | Log-gamma |
| Monocytes | Gamma |
| Naive CD4+ T cells | Normal |
| Naive CD8+ T cells | Laplace |
| Plasmablasts | Log-normal |
| Transitional B cells | Log-Laplace |

Circulating Immune Proteins

| Feature | Distr type |
|---|---|
| CD40L | Laplace |
| ENA78 | Laplace |
| EOTAXIN | Normal |
| FASL | Gamma |
| FGFB | Laplace |
| GCSF | Laplace |
| GMCSF | Log-normal |
| GROA | Laplace |
| HGF | Log-normal |
| ICAM1 | Laplace |
| IFNA | Laplace |
| IFNB | Laplace |
| IFNG | Laplace |
| IL10 | Laplace |
| IL12P40 | Laplace |
| IL12P70 | Laplace |
| IL13 | Normal |
| IL15 | Laplace |
| IL17F | Laplace |
| IL1A | Normal |
| IL1B | Gamma |
| IL1RA | Laplace |
| IL2 | Normal |
| IL4 | Normal |
| IL5 | Normal |

Circulating Immune Proteins (cont'd)

| Feature | Distr type |
|---|---|
| IL6 | Log-normal |
| IL7 | Normal |
| IL8 | Laplace |
| IP10 | Laplace |
| LEPTIN | Normal |
| LIF | Laplace |
| MCP1 | Laplace |
| MCP3 | Laplace |
| MCSF | Gamma |
| MIG | Log-normal |
| MIP1A | Laplace |
| MIP1B | Laplace |
| NGF | Laplace |
| PAI1 | Laplace |
| PDGFBB | Laplace |
| RANTES | Log-gamma |
| RESISTIN | Normal |
| SCF | Laplace |
| TGFA | Laplace |
| TGFB | Laplace |
| TNFA | Log-normal |
| TNFB | Laplace |
| TRAIL | Normal |
| VCAM1 | Laplace |
| VEGF | Laplace |

FIG. 14

| Study Year | # of subjects | Platform used |
|---|---|---|
| Flu-2007 | 26 | Flow Cytometry |
| Flu-2008 | 65 | Flow Cytometry |
| Flu-2009 | 122 | Flow Cytometry |
| Flu-2010 | 149 | Mass Cytometry |
| Flu-2011 | 154 | Mass Cytometry |
| Flu-2012 | 22 | Mass Cytometry |
| ChF-2013 | 397 | Mass Cytometry |

FIG. 15

| | |
|---|---|
| HEENT | GI |
| Head | Stomach |
| Eyes | Intestine |
| Ears | Other_Gastro |
| Nose | Hepatobiliary_Pancreas |
| Throat | Urologic |
| Cancer | Neurologic |
| Breast | Headache |
| Colon_Rectal | Neuro_Other |
| Melanoma | Blood_Lymph |
| Prostate | Endo_Metab |
| Skin_Non_Melanoma | Diabetes |
| Thyroid | High_Cholesterol |
| Other_Cancer | Other_Endo_Metabolic |
| Cardio | Musculoskeletal |
| Hypertension | Muscle_Joint_Aches |
| Coronary_Artery_Disease | Musculoskeletal_Surgical_Hx |
| Angina | Osteopenia_Osteoporosis |
| Heart_Attack | Osteoarthritis |
| Cardio_Surgery | Other_Musculoskeletal |
| Stroke | Genital_Reproductive |
| Heart_Valve | Dermatologic_Skin |
| Other_Cardio | Allergies |
| Respiratory | Psychiatric |
| Asthma | Depression |
| Emphysema | |
| Chron_Bronch | |
| Other_Respiratory | |

FIG. 16

METHOD FOR MEASURING SYSTEMIC CHRONIC INFLAMMAGING

CROSS-REFERENCE

This application claims the benefit of International Patent Application PCT/US2019/019047, filed Feb. 21, 2019, which claims the benefit of U.S. Provisional Application No. 62/633,539, filed Feb. 21, 2018; the entire contents of each of which are incorporated herein by reference.

GOVERNMENT RIGHTS

This invention was made with Government support under contracts AI057229 and AI090019 awarded by the National Institutes of Health. The Government has certain rights in the invention.

BACKGROUND

The role of the immune system in the maintenance of human health and protection against infections has been recognized for over a hundred years. However, it was not until recently that scientists came to the realization that immunity—especially the innate arm and deregulated inflammation—also dictates the outcome of non-infectious chronic diseases associated with older ages such as cancer, cardiovascular disease and neurodegenerative disorders, among others (Crusz and Balkwill, 2015; Kotas and Medzhitov, 2015; Liu et al., 2017). From these observations, it has been postulated that inflammation plays a critical role in regulating physiological aging (Franceschi and Campisi, 2014; Furman et al., 2017). Furthermore, the well-established nine hallmarks of aging (Lopez-Otin et al., 2013); (1) genomic instability, (2) shortening in telomere length, (3) epigenetic modifications, (4) loss of proteostasis, (5) deregulated nutrient sensing, (6) mitochondrial dysfunction, (7) cellular senescence, (8) stem cell exhaustion, and (9) altered intracellular communication, have all been shown to be caused, at least in part, by sustained systemic inflammation (Cavadas et al., 2016; Efeyan et al., 2015; Grivennikov et al., 2010; Hunter et al., 2007; Jurk et al., 2014; Lasry and Ben-Neriah, 2015; Nathan and Cunningham-Bussel, 2013; Oh et al., 2014a; Thevaranjan et al., 2017).

However, the inflammatory response to infections (acute response) largely contrasts from that associated with chronic illnesses (chronic inflammation). The former is mostly initiated in response to infectious agents through the interaction between pattern recognition receptors (PRRs) expressed in innate immune cells and evolutionarily conserved structures on pathogens, termed pathogen-associated molecular patterns (PAMPs). Upon engagement, PRRs trigger intracellular signaling cascades, which culminate in the expression of multiple inflammatory cytokines that orchestrate the host response to infection and serves as a prerequisite for the subsequent activation of adaptive immunity. In this type of inflammation, the rise in canonical inflammatory mediators such as Interleukin-6 (IL-6), Tumor Necrosis Factor-α (TNF-α) and Interleukin-1β (IL-1β), among others, is sharp causing a high-grade reaction that is self-limiting and often results in the removal of the stimulus, with activation of tissue repair mechanisms and healing (Medzhitov, 2008).

Contrary to the acute response, chronic and systemic inflammation is triggered by physical, chemical or metabolic noxious stimuli ("sterile" agents) such as those released by damaged cells and environmental insults, generally termed "damage-associated molecular patterns" (DAMPs). This type of inflammation is associated with aging and characterized by being low-grade and persistent, ultimately leading to collateral damage to tissues and organs (Goldberg and Dixit, 2015; Kotas and Medzhitov, 2015). Despite the extreme importance of this type of inflammatory reaction, there are currently no standard biomarkers to define chronic inflammation and studies have generally yielded conflicting results (Franceschi et al., 2017; Morrisette-Thomas et al., 2014).

To understand the immunological basis of healthy versus disease states, major recent efforts have been made to identify groups of individuals sharing a similar immunological make up, and to relate these with clinical and phenotypic information. Many of these studies have focused on the response to immune challenges as a surrogate of functional and protective immune systems, such as the increase in the levels of specific antibodies to a certain vaccine preparation (Furman et al., 2014; Furman et al., 2013; Haralambieva et al., 2016; Li et al., 2014; Nakaya et al., 2011; Oh et al., 2014b; Querec et al., 2009). Whereas the quality of a vaccine response can indeed inform about the potentiality of the immune system to protect from infectious diseases, the immune components that are important for fighting infections do not necessarily overlap with those that maintain general health as it relates to non-communicable chronic diseases.

Recent studies have demonstrated the enormous value of systems biology approaches to immunology, inflammation, aging and cardiovascular health (Furman et al., 2017; Shen-Orr et al., 2016) and in a more recent study, the proportion of various cell types were used to identify clusters of ambulatory individuals and correlate these with immunologically and clinically relevant outcomes (Kaczorowski et al., 2017). In such study, the authors identified a continuum of individuals with respect to their cell subpopulation profiles, which was correlated with the ability of immune cells to respond to different cytokine stimuli and, to a weaker extent, with the antibody response to an influenza vaccine.

SUMMARY

Described herein, among other things, is a method for measuring the levels of systemic chronic inflammaging of a subject.

According to one aspect of the invention, methods are provided for assessing systemic chronic inflammaging (SCI) of a subject, comprising: (a) measuring the amount of two or more (that is, 2, 3, 4, or 5) proteins selected from the group consisting of CXCL9, TRAIL, IFNG, EOTAXIN and GROA in a sample (e.g., blood serum) from the subject; and (b) calculating the SCI score of the subject based on weighted amounts of said two or more proteins. Disclosed herein is a method for calculating the SCI score using a guided auto-encoder algorithm, although other methods known in the art may be employed. The amount of these proteins can be measured using any well known method, including, for example, in a multiplex assay. We have discovered, for example, that increased amounts of CXCL9 and EOTAXIN positively correlate with SCI, while decreased amounts of TRAIL, IFNG and GROA negatively correlate with SCI. The SCI score may be adjusted for one or more of the following: chronological age, blood cholesterol, gender and BMI.

According to another aspect of the invention, methods are provided for identifying a subject in need of treatment to reduce systemic chronic inflammaging (SCI) comprising: (a) calculating an SCI score based on weighted amounts of two or more of proteins selected from the group consisting of CXCL9, TRAIL, IFNG, EOTAXIN and GROA in a sample from the subject; and, (b) if the SCI score is greater than chronological age of the subject, treating the subject to reduce SCI.

According to another aspect of the invention, kits are provided for measuring the systemic chronic inflammaging (SCI) of a subject, comprising: two or more capture agents that bind specifically to different proteins selected from the group consisting of CXCL9, TRAIL, IFNG, EOTAXIN, and GROA; and instructions for use. For example, such kits may use monoclonal antibodies as capture agents. As an alternative, such kits may include a set of antibodies—a primary antibody and a secondary antibody—that bind to each of the different proteins, e.g., to different parts of each protein. Optionally, the primary antibodies are each linked to a colored bead and the secondary antibodies are each labeled, e.g., biotinylated.

BRIEF DESCRIPTION OF THE FIGURES

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

FIG. 14 depicts immune features and their distributions.

FIG. 15 depicts the number of subject included and analytical platform used for each study year.

FIG. 16 depicts the disease features obtained from the clinical questionnaire obtained from a total of 527 study participants.

DETAILED DESCRIPTION

Figure 1:
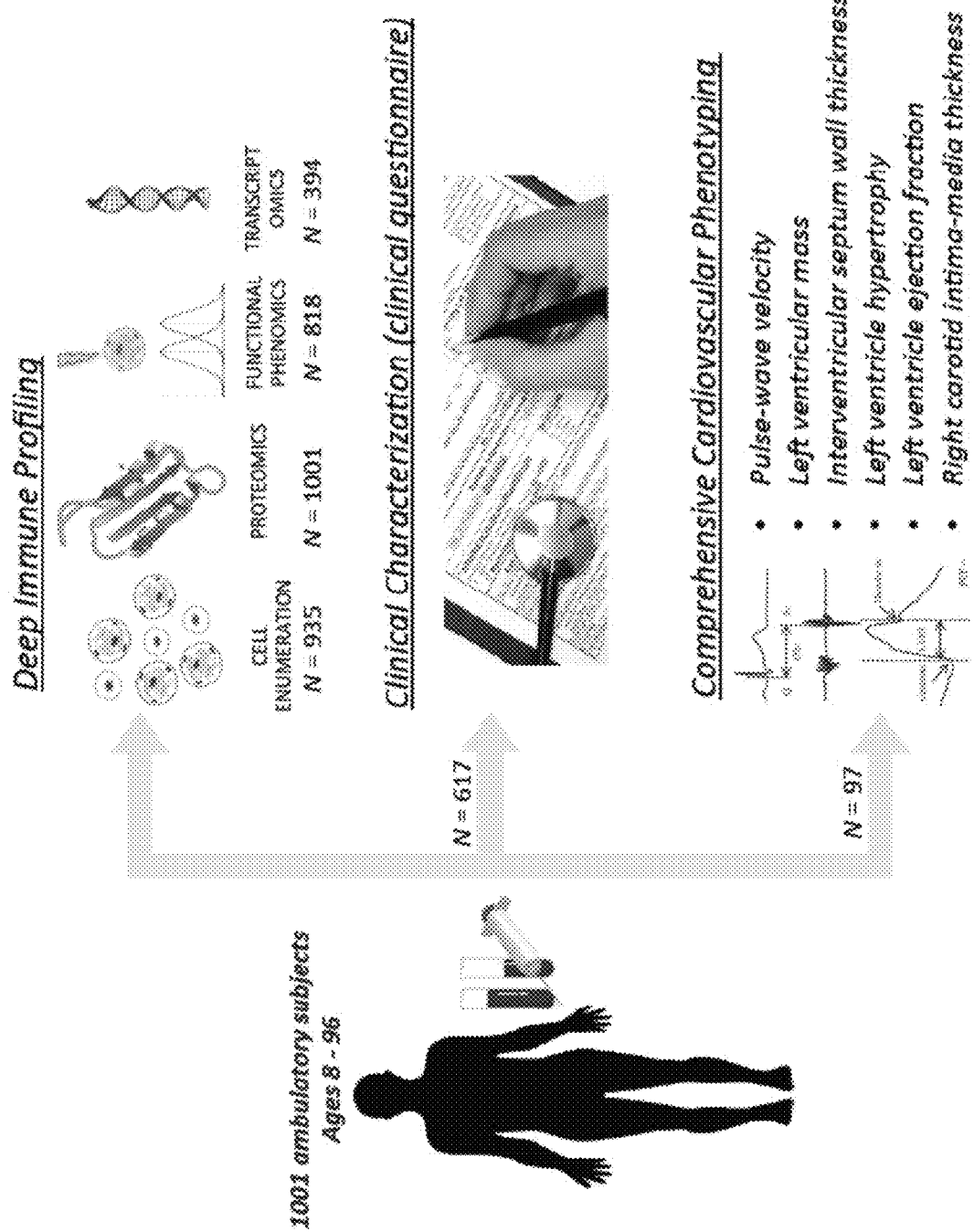
FIG. 1 depicts the 1000 Immunomes study design including the systematic analysis of immune systems via 'OMICS' approaches.

The practice of the present invention will employ, unless otherwise indicated, conventional methods of pharmacology, chemistry, biochemistry, recombinant DNA techniques and immunology, within the skill of the art. Such techniques are explained fully in the literature. See, e.g., *Handbook of Experimental Immunology*, Vols. I-IV (D. M. Weir and C. C. Blackwell eds., Blackwell Scientific Publications); A. L. Lehninger, *Biochemistry* (Worth Publishers, Inc., current addition); Sambrook, et al., *Molecular Cloning: A Laboratory Manual* (2nd Edition, 1989); *Methods In Enzymology* (S. Colowick and N. Kaplan eds., Academic Press, Inc.).

All publications, patents and patent applications cited herein, whether supra or infra, are hereby incorporated by reference in their entireties.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supercedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that, as used in this specification and the appended claims, the singular forms "a", "an" and "the" include plural referents unless the content clearly dictates otherwise. Thus, for example, reference to "an agonist" includes a mixture of two or more such agonists, and the like.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

A method for measuring the level of chronic inflammaging of a subject is provided, where the term SCI is intended to refer to the overall level of chronic inflammation of a subject at a period in time measured by a method that may comprise measuring the amount of two or more (e.g., two, three, four or five) of the proteins CXCL9, TRAIL, IFNG, EOTAXIN and GROA in blood serum from the subject and analyzing the output by a method that comprises calculating a score based on the weighted amounts of each of these proteins using a guided neural network algorithm (guided-autoencoder), where the score indicates the level of chronic inflammaging of the subject. Kits for performing the method are also provided. An "amount" of a protein refers to the absolute amount (e.g., micrograms [ug]), relative amount (with reference to an amount of another protein), concentration, mean fluorescence intensity (an indirect measurement of protein amount such as is obtained using a LUMINEX® assay, as described in the Example below), or other direct or indirect measurement.

Chronic inflammaging (SCI) correlates with cardiovascular disease and comorbidities, and is lower in individuals that are aging healthily (i.e., individuals with better overall health and decreased disease) and higher in individuals that are aging unhealthily (individuals with worse overall health, susceptibility to disease, a high incidence of co-morbidity and/or an increased rate of mortality). In some embodiments, the method may comprise measuring the amount of two or more of the proteins CXCL9, TRAIL, IFNG, EOTAXIN and GROA in blood serum from the subject and calculating a score based on the weighted amount of these proteins by a method that comprises a guided deep neural network (guided auto-encoder).

CXCL9 (C-X-C motif ligand 9), otherwise known as MIG (Monokine induced by gamma interferon) is a small cytokine belonging to the CXC chemokine family. CXCL9 is a T-cell chemoattractant that is induced by IFN-γ. Plasma CXCL9 elevations correlate with chronic GVHD diagnosis. CXCL9 is described in Kitko et al Blood 2014 123:786-93, as well sa Jansen et al BMC Infect. Dis. 17: 556. CXCL9 is encoded by human chromosome 4: 76,001,275-76,007,488 reverse strand, in assembly GRCh38.

TRAIL (TNF-related apoptosis-inducing ligand) is a cytokine that is produced and secreted by most normal tissue cells. It is thought to cause apoptosis primarily in tumor cells by binding to certain death receptors. TRAIL has also been designated CD253 (cluster of differentiation 253) and TNFSF10 (tumor necrosis factor (ligand) superfamily, member 10). TRAIL is described in Wiley et al Immunity 1005 3: 673-82 as well as Pitti J. Biol. Chem. 1996 271: 12687-90. TRAIL is encoded by human chromosome 3: 172,505,508-172,523,507, reverse strand, in assembly GRCh38.

INFG (otherwise known as interferon gamma, IFNγ or type II interferon) is a dimerized soluble cytokine that is the only member of the type II class of interferons. This protein is critical for innate and adaptive immunity against viral, some bacterial and protozoal infections. INFG is an important activator of macrophages and inducer of Class II major histocompatibility complex (MHC) molecule expression. Aberrant INFG expression is associated with a number of autoinflammatory and autoimmune diseases. INFG is described in Schoenborn et al Adv. Immunol. 2007 96: 41-101 as well as Gray Nature. 1982 298: 859-63. INFG is encoded by human chromosome 12: 68,154,768-68,159,747, reverse strand, in assembly GRCh38.

Eotaxin (also known as C-C motif chemokine 11 or eosinophil chemotactic protein) is a small cytokine belonging to the CC chemokine family. Eotaxin selectively recruits eosinophils by inducing their chemotaxis, and therefore, is implicated in allergic responses. The effects of eotaxin is mediated by its binding to a G-protein-linked receptor known as a chemokine receptor. Chemokine receptors for which CCL11 is a ligand include CCR2, CCR3 and CCR5. Eotaxin is described in Kitaura et al The Journal of Biological Chemistry 1996 271: 7725-30 and Jose et al The Journal of Experimental Medicine 1994 179: 881-7. Eotaxin is encoded by human chromosome 17: 34,285,668-34,288,334, forward strand, in assembly GRCh38.

GROA (also known as CXCL1, the GRO1 oncogene, GROα, KC, neutrophil-activating protein 3 (NAP-3) and melanoma growth stimulating activity, alpha (MSGA-α)) is secreted by human melanoma cells, has mitogenic properties and is implicated in melanoma pathogenesis. GROA is expressed by macrophages, neutrophils and epithelial cells, and has neutrophil chemoattractant activity. This chemokine elicits its effects by signaling through the chemokine receptor CXCR2. GROA is described in Haskill et al Proc. Natl. Acad. Sci. U.S.A. 190 87 (19): 7732-6. GROA is encoded by human chromosome 4: 73,869,393-73,871,242, forward strand, in assembly GRCh38.

We have discovered that increased CXCL9 and EOTAXIN in a subject (relative to the average expression in a control population) positively correlate with SCI, whereas decreased TRAIL IFNG and GROA in a subject (relative to the average expression in a control population) negatively correlate with SCI.

The method may comprise measuring the amount of two, three, four or five of the proteins CXCL9, TRAIL, IFNG, EOTAXIN and GROA (e.g., CXCL9, TRAIL, and IFNG, CXCL9, TRAIL and EOTAXIN or CXCL9, TRAIL and GROA in a sample from the subject and analyzing the output data using a method that comprises calculating a score based on the weighted amounts of each of these proteins, for example and without limitation, using a guided auto-encoder. Blood serum is a suitable sample, although other samples that contain such proteins may also be used, e.g., whole blood, tissue, and so on.

The method also may comprise measuring the amount of four or more of the proteins CXCL9, TRAIL, IFNG, EOTAXIN and GROA (e.g., CXCL9, TRAIL, IFNG and EOTAXIN, CXCL9, TRAIL, IFNG and GROA, CXCL9, TRAIL, EOTAXIN and GROA, or CXCL9, IFNG, EOTAXIN and GROA) in blood serum from the subject and analyzing the output data using a method that comprises calculating a score based on the weighted amounts of each of these proteins.

The method also may comprise measuring the amount of all of the proteins CXCL9, TRAIL, IFNG, EOTAXIN and GROA in blood serum from the subject and analyzing the output data using a method that comprises calculating a score based on the weighted amounts of each of these proteins.

Any suitable method may be used to measure the amount of the proteins. For example, the amount of the proteins may be measured by Western blotting, mass spectrometry or using an immunoassay such as ELISA. Many of these methods involve binding a sample containing the proteins with capture agents that specific ally bind to the proteins, e.g., a capture agent that specifically binds to CXCL9, a capture agent that specifically binds to TRAIL, a capture agent that specifically binds to IFNG, a capture agent that specifically binds to EOTAXIN, and a capture agent that specifically binds to GROA, and then measuring the amount of the proteins bound to the capture agents. As such, in some embodiments, the amounts of the proteins may be measured in a multiplexed assay.

Capture agents include, without limitation, antibodies (including polyclonal and monoclonal antibodies, Fab, Fab', F(ab')$_2$, scFv, dsFv, ds-scFv, dimers, minibodies, nanobodies diabodies, and multimers thereof and bispecific antibodies or antibody fragments), aptamers, affimers, knottins, etc.

Multiplex assays are available in several different formats based on the utilization of flow cytometry, chemiluminescence, or electrochemiluminescence technology. Flow cytometric multiplex arrays, also known as bead-based multiplex assays, include the cytometric bead array (CBA) system from BD Biosciences and the LUMINEX® multi-analyte profiling technology from LUMINEX®. These platforms both employ proprietary bead sets which are distinguishable under flow cytometry. Each bead set is coated with a specific capture antibody, and fluorescence or streptavidin-labeled detection antibodies bind to the specific protein-capture antibody complex on the bead set. Multiple proteins in a biological liquid sample can thus be recognized and measured by the differences in both bead sets, with chromogenic or fluorogenic emissions detected using flow cytometric analysis. Multiplex ELISA (e.g., from Quansys Biosciences) involves coating multiple specific capture antibodies at multiple spots (one antibody at one spot) in the same well in a multi-well microplate. Chemiluminescence technology, which is more sensitive than chromogenic detection in traditional ELISA, is then employed to detect multiple cytokines at the corresponding spots on the plate. Multiplex kits from Meso Scale Discovery employ electrochemiluminescence technology with multiple specific capture antibodies coated at corresponding spots on an electric wired microplate. The detection antibody is conjugated to a proprietary tag which is excited with emission beams in the electric field.

In some embodiments, a bead-based assay may be used. Bead-based assays use polystyrene or paramagnetic beads (which may also be referred to as microspheres), that are internally dyed with fluorophores of differing colors, intensities and/or ratios such that the beads can be distinguished from each other. Individual bead sets are then coated with a capture antibody qualified for one specific analyte. Multiple analyte-specific beads can then be combined in a single well. In this method, the sample is added to a mixture of color-coded beads, pre-coated with analyte-specific capture antibodies. The antibodies bind to the analytes of interest. Biotinylated detection antibodies specific to the analytes of interest are added and form an antibody-antigen sandwich. Phycoerythrin (PE)-conjugated streptavidin is added, which binds to the biotinylated detection antibodies. Polystyrene beads are read on a dual-laser flow-based detector, in which one laser classifies the bead and determines the analyte that is being detected. The second laser determines the magnitude of the PE-derived signal, which is in direct proportion to the amount of analyte bound. Alternatively, magnetic beads can be read using a magnet to captures and holds the magnetic beads in a monolayer, while two spectrally distinct light-emitting diodes (LEDs) illuminate the beads. One LED identifies the analyte that is being detected and, the second LED determines the magnitude of the PE-derived signal. Exemplary bead-based assays are described in Dupont et al (J. Reprod Immunol. 2005 66:175-91) and Khalifian et al (J Invest Dermatol. 2015 135: 1-5).

Binding of the proteins to the capture agents can be measured by any means, including the use of an optically detectable (e.g., fluorescently labeled or light emitting) secondary antibody, plasmon resonance, or magnetoresistance, etc.

In measuring the proteins CXCL9, TRAIL, IFNG, EOTAXIN and GROA, the absolute amount of each protein may be determined, or the amount of each protein relative to one or more control proteins may be determined, analyzing the output data using a method that comprises calculating a score based on the weighted amounts of each of these proteins using a guided auto-encoder.

Also provided is a computer implemented method for measuring the SCI of a subject. This method may comprise receiving the measured amounts of two or more of (e.g., three, four or all of) the proteins CXCL9, TRAIL, IFNG, EOTAXIN and GROA in blood serum from the subject, executing an algorithm that calculates SCI based on the amounts of each of the proteins using a guided auto-encoder. In some embodiments, this method may comprise inputting the measurements into a computer and executing a guided auto-encoder algorithm that can calculate SCI using the input measurements from the determination of CXCL9, TRAIL, IFNG, EOTAXIN and GROA levels.

In some embodiments, the method may involve creating a report that shows the levels of chronic inflammaging of the subject, e.g., in an electronic form, and forwarding the report to a doctor or other medical professional to help identify a suitable course of action, e.g., to identify a suitable therapy for the subject. The report may be used along with other metrics as a diagnostic to determine whether the subject has a disease or condition.

In any embodiment, report can be forwarded to a "remote location", where "remote location," means a location other than the location at which the image is examined. For example, a remote location could be another location (e.g., office, lab, etc.) in the same city, another location in a different city, another location in a different state, another location in a different country, etc. As such, when one item is indicated as being "remote" from another, what is meant is that the two items can be in the same room but separated, or at least in different rooms or different buildings, and can be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the internet or including email transmissions and information recorded on websites and the like. In certain embodiments, the report may be analyzed by an MD or other qualified medical professional, and a report based on the results of the analysis of the image may be forwarded to the patient from which the sample was obtained.

In computer-related embodiments, a system may include a computer containing a processor, a storage component (i.e., memory), a display component, and other components typically present in general purpose computers. The storage component stores information accessible by the processor, including instructions that may be executed by the processor and data that may be retrieved, manipulated or stored by the processor.

The storage component includes instructions for determining the SCI of a subject using the measurements described above as inputs. The computer processor is coupled to the storage component and configured to execute the instructions stored in the storage component in order to receive patient data and analyze patient data according to one or more algorithms. The display component may display information regarding the diagnosis of the patient.

The storage component may be of any type capable of storing information accessible by the processor, such as a hard-drive, memory card, ROM, RAM, DVD, CD-ROM, USB Flash drive, write-capable, and read-only memories. The processor may be any well-known processor, such as processors from Intel Corporation. Alternatively, the processor may be a dedicated controller such as an ASIC.

The instructions may be any set of instructions to be executed directly (such as machine code) or indirectly (such as scripts) by the processor. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance.

Data may be retrieved, stored or modified by the processor in accordance with the instructions. For instance, although the diagnostic system is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information which is used by a function to calculate the relevant data.

Treatment

We have provided methods for measuring systemic chronic inflammaging (SCI) of a subject, comprising measuring the amount of two or more of proteins selected from the group consisting of CXCL9, TRAIL, IFNG, EOTAXIN and GROA in a sample from the subject, and calculating the SCI of the subject based on the weighted amounts of the proteins. Based on the SCI measured in this way, subject may be treated by any of the known methods for reducing systemic chronic inflammaging, whether alone or in combination: (1) pharmacological treatment, including without limitation anti-inflammatory drugs (NSAIDs such as, for example, aspirin, ibuprofen, and naproxen) or corticosteroids; (2) neutraceuticals or nutritional supplements, including without limitation fish oil, lipoic acid, and curcumin, or spices such as ginger, garlic, and cayenne; (3) dietary change, including without limitation increasing the intake of foods that are high in antioxidants and polyphenols, such as olive oil, leafy greens (e.g., kale and spinach), tomatoes, fatty fish (e.g., salmon, sardines, and mackerel), nuts, and fruits (e.g., cherries, blueberries, and oranges), and/or decreasing the intake of foods that can increase inflammation such as refined carbohydrates (e.g., white bread and pastries), fried foods, red meat, and processed meat; and (4) lifestyle changes including without limitation eliminating or reducing smoking and alcohol intake, maintaining a healthy body weight, and reducing stress levels.

Kits

Also provided by this disclosure are kits that contain reagents for practicing the subject methods, as described above. The subject kits contain one or more of any of the components described above. In some embodiments a kit may comprise, for example two or more (e.g., 3, 4, or all) of: a capture agent that specifically binds to CXCL9, a capture agent that specifically binds to TRAIL, a capture agent that specifically binds to IFNG, a capture agent that specifically binds to EOTAXIN, a capture agent that specifically binds to GROA. In any embodiment, the capture agents can be an antibody. In some embodiments, for each protein, the kit may contain a primary antibody and a secondary antibody, wherein the primary and secondary antibodies bind to different parts of the protein. In some embodiments, the primary antibody may be linked to a color coded bead and the secondary antibody may be labeled, e.g., biotinylated. The antibodies can be in the form of an array.

The various components of the kit may be present in separate containers or certain compatible components may be precombined into a single container, as desired.

In addition to the above-mentioned components, the subject kits may further include instructions for using the components of the kit to practice the subject methods, i.e., instructions for sample analysis. The instructions for practicing the subject methods are generally recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or subpackaging), etc. In other embodiments, the instructions are present as an electronic storage data file present on a suitable computer readable storage medium. In yet other embodiments, the actual instructions are not present in the kit, but means for obtaining the instructions from a remote source, e.g., via the internet, are provided. An example of this embodiment is a kit that includes a web address where the instructions can be viewed and/or from which the instructions can be downloaded. As with the instructions, the means for obtaining the instructions is recorded on a suitable substrate.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., room temperature (RT); base pairs (bp); kilobases (kb); picoliters (pl); seconds (s or sec); minutes (m or min); hours (h or hr); days (d); weeks (wk or wks); nanoliters (nl); microliters (ul); milliliters (ml); liters (L); nanograms (ng); micrograms (ug); milligrams (mg); grams ((g), in the context of mass); kilograms (kg); equivalents of the force of gravity ((g), in the context of centrifugation); nanomolar (nM); micromolar (uM), millimolar (mM); molar (M); amino acids (aa); kilobases (kb); base pairs (bp); nucleotides (nt); intramuscular (i.m.); intraperitoneal (i.p.); subcutaneous (s.c.); and the like.

In this study, the goal was to establish the first compendium for human immunology, the 1000 Immunomes Project (1KIP), wherein samples from 1001 subjects were comprehensively studied in a single data-centered facility; the Stanford Human Immune Monitoring Center (HIMC), where peripheral blood specimens are processed and analyzed using rigorously standardized procedures. Complete immune characterization was conducted using multiple technological platforms to measure whole-genome transcriptome, the serum proteome, cell subset abundances, the cellular responses to multiple stimuli and the seropositivity to cytomegalovirus infection. A comprehensive health assessment using a 53-feature clinical questionnaire was obtained from over half of the participants.

A total of 16 distinct immunotypes were identified which revealed the existence of two classes of older adults: a healthy and an unhealthy aging immunotype, characterized by major differences in multiple immune features, including their levels of chronic inflammation, as well as in the incidence of cardiovascular conditions and in the rates of mortality. Deep learning methods were used to compactly represent multidimensional protein data into a low dimensional space to derive SCI, the level of which was significantly correlated with comorbidities and with cardiovascular aging. In a follow-up study of 97 healthy older adults who were also monitored at the HIMC for the same inflammatory markers, along with a cardiovascular 27-feature phenotyping screening at the Stanford Cardiovascular Institute, it was determined that the most robust contributor to SCI, the interferon-related chemokine CXCL9, tracked with subclinical cardiac hypertrophy. This chemokine was also expressed in large quantities by aged endothelium derived from human induced pluripotent stem cells (hiPSC) and induced down-regulation in the mRNA expression of the cardio-protective deacetylase SIRT3.

The results demonstrate a critical role for inflammation in aging and cardiovascular disease.

Example 1

Materials and Methods

Experimental Model and Subject Details

The 1000 Immunomes Study Cohort: The 1KIP consists in 1001 ambulatory individuals (339 males and 662 females) recruited at Stanford University during the years 2007 to 2016 for a study of aging and vaccination (N=605) (Blazkova et al., 2017; Brodin et al., 2015; Furman et al., 2017; Furman et al., 2014; Furman et al., 2013; Furman et al., 2015; Price et al., 2013; Roskin et al., 2015; Shen-Orr et al., 2016; Wang et al., 2014), and for an independent study of chronic fatigue syndrome (Montoya et al., 2017), from which data from the control set of participants only (N=396) was utilized.

Aging and vaccination study cohort: Study participants were enrolled in an influenza vaccine study at the Stanford-LPCH Vaccine Program during the years 2007 to 2016. Since baseline samples were obtained from all the individuals prior to vaccination with the influenza vaccine, no randomization or blinding was done for this study. The protocol for this study was approved by the Institutional Review Board of the Research Compliance Office at Stanford University. Informed consent was obtained from all subjects. All individuals were ambulatory. At the time of initial enrollment volunteers had no acute systemic or serious concurrent illness, no history of immunodeficiency, nor any known or suspected impairment of immunologic function, including clinically observed liver disease, diabetes mellitus treated with insulin, moderate to severe renal disease, blood pressure >150/95 at screening, chronic hepatitis B or C, recent or current use of immunosuppressive medication. In addition, on each annual vaccination day, none of the volunteers had been recipients or donors of blood or blood products within the past 6 months and 6 weeks respectively, and none showed any signs of febrile illness on day of baseline blood draw. Peripheral blood samples were obtained from venipuncture and mononuclear cells were separated and stored at the Stanford Clinical & Translational Research Unit (CTRU). Whole blood was used for gene expression analysis (below). Serum was separated by centrifugation of clotted blood, and stored at −80° C. before CMV serology, cytokine and chemokine determination.

Chronic Fatigue Study cohort: Study participants were recruited from Northern California from Mar. 2, 2010 to Sep. 1, 2011. Their peripheral blood was drawn between 8:30 AM and 3:30 PM on the day of enrollment. These samples were collected at baseline for each participant (no exercise prior to blood sampling). In addition, as each ME/CFS patient was being recruited into the study, two corresponding, age and sex matched controls, were contemporaneously enrolled until the target sample size of 200 patients and 400 controls was achieved. This approach resulted in patients and controls being intercalated in their time of entry into the study. Eight milliliters of blood were drawn into a red-topped serum tube (Fisher Scientific) by the CTRU's phlebotomy team. Serum was obtained by allowing blood to clot for 40 min. Once clotted, the blood tube was centrifuged in a refrigerated (4° C.) centrifuge (Allegra X-15R, Beckman Coulter) at 2000×G for 15 minutes. Serum was isolated and mixed thoroughly in a tube using a 2-milliliter sterile, serological pipette (Fisher Scientific) to obtain a homogenous solution prior to dispensing to storage tubes. Serum was distributed into aliquots per the Stanford Human Immune Monitoring Center (HIMC) aliquot guidelines and frozen at −80° C. For the day of the cytokine assay, matched sets of ME/CFS cases and healthy controls were always mixed in all plates to reduce confounding case status with plate artifacts. In summary, ME/CFS patients and controls were treated identically in terms of recruitment and sera handling protocols.

Cardiovascular study cohort: After approval by Stanford's Institutional Review Board, 151 subjects participating in the National Institute of Health sponsored 5 U19 AI05086 study and Stanford Cardiovascular Institute Aging Study were screened for inclusion in the study. The screening process included a comprehensive health questionnaire including the London School of Hygiene Cardiovascular questionnaire. Exclusion criteria included the following: history of acute or chronic illness such as atherosclerosis, systemic hypertension, diabetes mellitus or dementia, familial history of early cardiovascular disease (<55 year old), on non-steroidal anti-inflammatory drugs or on inhaled steroids on a regular basis, history of malignancies, history of surgery within the last year, history of atopic skin disease, history of infection within the last 3 months including upper respiratory infections or urinary infections, and history of vaccination within the past 3 months. Patients older than 80 years old who had a prior history of mild systemic hypertension but with a normal blood pressure at the time of the visit (blood pressure<140/90 mmHg) were not excluded from the study. Based on the inclusion and exclusion criteria, 97 subjects were included in the study. The patients were divided into 4 groups according to pre-specified age boundaries (i.e., between 25 and 44, 45 to 60, 60 to 75 and 75 to 90 years old).

Human iPSC Generation and Culture: Protocols for isolation and use of patient blood were approved by the Stanford University Human Subjects Research Institutional Review Board. Details on the isolation of patient blood, as well as the generation, culture, characterization, of hiPSCs, have been previously published (Matsa et al., 2016).

Human iPSC Differentiation to Endothelial Cells: Human iPSCs (hiPSCs) were seeded on matrigel plates and grown in hiPSC medium for 4 days to 75-80% confluency. Differentiation to ECs were initiated by treating the hiPSCs with 6 µM CHIR99021 in RPMI-B27 without insulin media (Life Technologies) for 2 days, followed by another treatment of 2 µM CHIR99021 in RPMI-B27 without insulin media for 2 days. Following these treatments, the differentiating hiPSCs were subjected to endothelial medium EGM2 (Lonza) supplemented with 50 ng/mL VEGF, 20 ng/ml BMP4, and 20 ng/ml FGFb for 7 days, with medium being changed every 2 days. On day 12, induced ECs were isolated using MAC sorting, where cells were first dispersed by trypsin, then incubated with CD144 antibody, and finally passed through a MACS column containing CD144-conjugated magnetic microbeads (Miltenyi Biotec). The sorted cells were then seeded on 0.2% gelatin-coated plates and maintained in EGM2 media supplemented with 10 µM SB431542 (TGFb inhibitor). hiPSC-ECs were passaged on confluence and maintained in EGM2 medium.

In vitro monolayer cardiomyocyte differentiation of human iPSCs: To induce cardiomyocyte differentiation, approximately $1 \times 10^5$ undifferentiated iPSCs were seeded in each well of Matrigel-coated 6-well plates and cultured in differentiation medium following previous protocol (Gu et al., 2017; Lian et al., 2012). Glucose-free MEMα supplemented with FBS and lactate has been employed to enrich cells to 98.0% α-actinin-positive at 37° C., 20% O2, and 5% $CO_2$ in a humidified incubator with medium changes every 48 hours, and cells were passaged once they reached 80-90% confluence. Human iPSC-CMs were treated immediately after enrichment.

Cell lines: Human Umbilical Vein Endothelial Cells (HUVEC) were purchased from Lonza and cultured following their protocol. Fibroblasts were cultured as previously described (Takahashi and Yamanaka, 2006).

Method Details

Cardiovascular phenotyping: Cardiovascular age was assessed using 3 parameters: (1) aortic pulse wave velocity (PWV), a measure of vascular stiffness; (2) relative wall thickness (RWT), a measure of ventricular remodeling, and (3) early diastolic mitral annular velocities (e'), a measure of ventricular relaxation. In addition, the ratio of early mitral inflow velocity (E) to e', a surrogate marker of end-diastolic filling pressures (Nagueh et al., 2009; Redfield et al., 2005) was measured.

Aortic PWV was calculated as the ratio of the pulse wave distance (in meters) to the transit time (in seconds). A 9.0 MHz Philips linear array probe was used to assess the carotid arteries (main common, bulb and internal carotid artery) and proximal femoral arteries. Pulse wave distance (D) was measured as the distance from the sternal notch to the femoral artery ($x_{direct}$) from which the distance from the sternal notch to proximal descending aorta was subtracted ($D = x_{direct} - x_{notch-aorta}$). The intersecting tangent method was used to measure the time from a reference ECG signal and the foot of the pulse wave. Heart rate had to be within 2 bpm between the carotid and femoral signal. All Doppler signals were recorded at 150 mm/s. Inter-observer variability was calculated on 50 samples in the laboratory and the intraclass correlation coefficient was 0.94 for PWV measured by 2 independent observers (independent measures of path length and transit time).

Echocardiograms were performed using the Philips IE33 echocardiographic system according to the recommendations of the American Society of Echocardiogram. (Lang et al., 2005) All studies were interpreted by one physician (FH)

who was blinded to age as well as clinical and biological data. All parameters were measured in triplicate and averaged. Ventricular dimensions and wall thickness were measured using M-mode derived measures; septal band was excluded from the measurement of the septum and chordates from the measurements of the posterior wall. RWT was calculated as the sum of septal and posterior wall divided by left ventricular internal dimensions. Ventricular mass was estimated using the ASE recommended formula based on modeling the LV as a prolate ellipse (Lang et al., 2005). Left ventricular ejection fraction was estimated using the Simpson biplane method. The tissue Doppler e' velocity represents an average of the septal and lateral annulus (Nagueh et al., 2009; Redfield et al., 2005). Inter-observer variability was calculated on 50 samples; the intraclass correlation in the laboratory is 0.93 for LV mass measurements.

Induced human pluripotent stem cell-derived cardiomyocytes and endothelial cells: iPSCs were derived from 5 healthy individuals and cells lines passed common assessments for pluripotency and genomic stability. These iPSCs were differentiated into cardiomyocytes to purities of >85% and endothelial cells to purities of >90%. iPSC-CMs were differentiated on day 30 and iPSC-ECs were differentiated on day 14. Both types of cells expressed mature cell markers. The experimental component of the present study focused on 3 different components of INF-7 signaling pathway.

To analyze gene expression CXCR3, RNA was isolated using an RNEASY® Plus kit (QIAGEN), cDNA was produced using a High Capacity RNA-to-cDNA kit (Life Technologies), and real-time PCR was performed using TAQMAN™ Gene Expression Assays, TAQMAN™ Gene Expression Master Mix, and a STEPONEPLUS™ Real-Time PCR System (Life Technologies). All PCR reactions were performed in triplicate, normalized to the GAPDH endogenous control gene, and assessed using the comparative Ct method.

Quantitative real-time PCR: To analyze the gene expression pattern for CXCL9 and SIRT3, RNA was extracted using Qiagen RNA isolation kit (Qiagen 74104) and cDNA was synthesized using QSCRIPT™ cDNA SuperMix (QuantaBio). Real-time PCR was performed using TAQMAN™ Gene Expression Assays (GAPDH, Hs02758991_g1, CXCL9, Hs00171065_ml, SIRT3, Hs00953477_ml), TAQMAN™ Master Mix, and a 7900HT Real-Time PCR System (ThermoFisher Scientific). All PCR reactions were performed in triplicate, normalized to the GAPDH housekeeping gene, and assessed using the ΔΔCt relative quantification (RQ) method.

Vascular Tubelike Formation: The functions of the generated hiPSC-ECs were characterized in angiogenic assays and compared to hiPSCs. The generated hiPSC-EC were assessed for their ability to form tubelike structures by seeding $1\times10^4$ cells in wells coated with MATRIGEL® (CORNING® MATRIGEL® Matrix) containing EGM2 medium supplemented with 50 ng/mL VEGF and incubated for 16-24 hours.

Flow Cytometry Immunophenotyping: This assay was performed by the Human Immune Monitoring Center at Stanford University. PBMC were thawed in warm media, washed twice and resuspended at 1×10^7 viable cells/mL. 50 uL cells per well were stained for 45 min at room temperature with the antibodies shown in the Key Resources Table (all reagents from BD Biosciences, San Jose, CA). Cells were washed three times with FACS buffer (PBS supplemented with 2% FBS and 0.1% sodium azide), and resuspended in 200 uL FACS buffer. 100,000 lymphocytes per sample were collected using DIVA 6.0 software on an LSRII flow cytometer (BD Biosciences). Data analysis was performed using FlowJo v 9.3 by gating on live cells based on forward versus side scatter profiles, then on singlets using forward scatter area versus height, followed by cell subset-specific gating Phosphoepitope Flow Cytometry (Cytokine stimulation, pSTAT readouts): This assay was performed by the Human Immune Monitoring Center at Stanford University. PBMC were thawed in warm media, washed twice and resuspended at 0.5×10^6 viable cells/mL. 200 µL of cells were plated per well in 96-well deep-well plates. After resting for 1 hour at 37° C., cells were stimulated by adding 50 ul of cytokine (IFNa, IFNg, IL-6, IL-7, IL-10, IL-2, or IL-21) and incubated at 37° C. for 15 minutes. The PBMCs were then fixed with paraformaldeyde, permeableized with methanol, and kept at −80 C overnight. Each well was bar-coded using a combination of Pacific Orange and Alexa-750 dyes (Invitrogen, Carlsbad, CA) and pooled in tubes. The cells were washed with FACS buffer (PBS supplemented with 2% FBS and 0.1% sodium azide), and stained with the following antibodies (all from BD Biosciences, San Jose, CA): CD3 Pacific Blue, CD4 PerCP-Cy5.5, CD20 PerCp-Cy5.5, CD33 PE-Cy7, CD45RA Qdot 605, pSTAT-1 AlexaFluor488, pSTAT-3 AlexaFluor647, pSTAT-5 PE. The samples were then washed and resuspended in FACS buffer. 100,000 cells per stimulation condition were collected using DIVA 6.0 software on an LSRII flow cytometer (BD Biosciences). Data analysis was performed using FlowJo v 9.3 by gating on live cells based on forward versus side scatter profiles, then on singlets using forward scatter area versus height, followed by cell subset-specific gating.

CYTOF® Immunophenotyping: This assay was performed in the Human Immune Monitoring Center at Stanford University. PBMCs were thawed in warm media, washed twice, resuspended in CYFACS® buffer (PBS supplemented with 2% BSA, 2 mM EDTA, and 0.1% sodium azide), and viable cells were counted by Vicell. Cells were added to a V-bottom microtiter plate at 1.5 million viable cells/well and washed once by pelleting and resuspension in fresh CYFACS® buffer. The cells were stained for 60 min on ice with 50 µL of the following antibody-polymer conjugate cocktail depicted in the Key Resources Table. All antibodies were from purified unconjugated, carrier-protein-free stocks from BD Biosciences, Biolegend, or R&D Systems. The polymer and metal isotopes were from DVS Sciences. The cells were washed twice by pelleting and resuspension with 250 uL FACS buffer. The cells were resuspended in 100 uL PBS buffer containing 2 µg/mL Live-Dead (DOTA-maleimide (Macrocyclics) containing natural-abundance indium). The cells were washed twice by pelleting and resuspension with 250 uL PBS. The cells were resuspended in 100 uL 2% PFA in PBS and placed at 4 C overnight. The next day, the cells were pelleted and washed by resuspension in fresh PBS. The cells were resuspended in 100 uL eBiosciences permeabilization buffer (1× in PBS) and placed on ice for 45 min before washing twice with 250 uL PBS. If intracellular staining was performed, the cells were resuspended in 50 uL antibody cocktail in CYFACS® for 1 hour on ice before washing twice in CYFACS®. The cells were resuspended in 100 uL iridium-containing DNA intercalator (1:2000 dilution in PBS; DVS Sciences) and incubated at room temperature for 20 min. The cells were washed twice in 250 uL MILLIQ® water. The cells were diluted in a total volume of 700 uL in MILLIQ® water before injection into the CYTOF® (DVS Sciences). Data analysis was performed using FlowJo v 9.3 (CYTOF® settings) by gating on intact cells based on the iridium isotopes from the intercalator, then on singlets by Ir191 vs cell length, then on live cells (Indium-LiveDead minus population), followed by cell subset-specific gating.

Phosphoepitope CYTOF® (Cytokine stimulation, pSTAT readouts): This assay was performed by the Human Immune Monitoring Center at Stanford University. PBMC were thawed in warm media, washed twice, counted by Vi-cell and resuspended at $5 \times 10^6$ viable cells/mL. 100 µL of cells were plated per well in 96-well deep-well plates. After resting for 1 hour at 37° C., cells were stimulated by adding 25 ul of stim (IFNa, IL-6, IL-7, IL-10, IL-21, LPS or PMA/ionomycin) and incubated at 37° C. for 15 minutes. Cells were then fixed with paraformaldehyde, washed twice with CYFACS® buffer (PBS supplemented with 2% BSA, 2 mM EDTA, and 0.1% sodium azide) and stained for 30 min at room temperature with 20 µL of surface antibody cocktail. Cells were washed twice with CYFACS®, permeabilized with 100% methanol and kept at −80 C overnight. Next day cells were washed with CYFACS® buffer and resuspended in 20 uL intracellular antibody cocktail in CYFACS® for 30 min at room temperature before washing twice in CYFACS®. Cells were resuspended in 100 uL iridium-containing DNA intercalator (1:2000 dilution in 2% PFA in PBS) and incubated at room temperature for 20 min. Cells were washed once with CYFACS® buffer and twice with MILLIQ® water. Cells were diluted to $750 \times 10^5$ cells/mL in MILLIQ® water before injection into the CYTOF®. Data analysis was performed using FlowJo v 9.3 (CYTOF®settings) by gating on intact cells based on the iridium isotopes from the intercalator, then on singlets by Ir191 vs cell length followed by cell subset-specific gating.

Gene expression microarray assays: 500 ng of high-quality total RNA was used for the Illumina gene expression microarray (HumanHT-12 BeadChip, v 4) experiment. The Illumina Direct Hyb labeling method performs 3-based gene expression measurements through reverse transcription and in vitro transcription techniques that incorporate biotin-labeled nucleotides into the nascent products. Labeled complementary RNA (cRNA) products are hybridized onto bead arrays, washed and stained with streptavidin-Cy3. Each array on the HumanHT-12 BeadChip targets more than 25,000 annotated genes with more than 48,000 probes. Hybridizations and scanning were performed using the Illumina BEADARRAY™ reader at the Stanford Functional Genomics Facility (SFGF) as described in the Whole-Genome Gene Expression Direct Hybridization Assay Guide (Catalog #BD-901-1002 Part #11322355 Rev. A). Data were extracted using the Illumina BeadStudio for further data analysis.

Determination of Serum Immune Proteins: LUMINEX®-Polystyrene bead kits. This assay was performed in the Human Immune Monitoring Center at Stanford University. Human 50 or 51-plex kits were purchased from Panomics/Affymetrix and used according to the manufacturer's recommendations with modifications as described below. Briefly, samples were mixed with antibody-linked polystyrene beads on 96-well filter-bottom plates and incubated at room temperature for 2 h followed by overnight incubation at 4° C. Room temperature incubation steps were performed on an orbital shaker at 500-600 rpm. Plates were vacuum filtered and washed twice with wash buffer, then incubated with biotinylated detection antibody for 2 h at room temperature. Samples were then filtered and washed twice as above and re-suspended in streptavidin-PE After incubation for 40 minutes at room temperature, two additional vacuum washes were performed, and the samples re-suspended in Reading Buffer. Each sample was measured in duplicate. Plates were read using a LUMINEX® 200 instrument with a lower bound of 100 beads per sample per cytokine. Custom assay Control beads by Radix Biosolutions are added to all wells.

Quantification and Statistical Analysis

Distribution of immune features: The input data consisted in serum protein micro-flow imaging (MFI) and cell subpopulation frequency data. The data was first log-transformed and then 6 different distributions (Normal, Laplace, LogNormal, log-Laplace, Gamma, log-Gamma) were fit on each input feature using max likelihood estimation (ILE). To identify the best distribution for each feature, a five-fold-cross-validation test was performed for each distribution. A t-test p-value was calculated for the five-fold test likelihoods between normal distribution and other distribution.

Identification of Immunotypes: Agglomerative clustering on the processed cell subpopulation data was performed. To identify the best cluster number, gap-statistic is used (Tibshirani et al., 2001). The gap-statistic utilizes bootstrap to estimate the cluster quality, which is the improvement comparing to a null hypothesis that the data is uniformly distributed. It chooses the smallest number of cluster when adding another cluster would not provide significant increase in cluster quality. With a 1000-sample bootstrap test, the best number of cluster is decided to be 16. Hence, an agglomerative clustering with 16 clusters is performed on the data, to identify the 16 immune sub-types.

Immunological analysis of immunotypes: Immune protein data (50 cytokines, chemokines and growth factors: MIG, TRAIL, IFNG, EOTAXIN, GROA, IL2, TGFA, PAI1, MIP1A, LEPTIN, IL1B, LIF, IL5, IFNA, IL4, NGF, HGF, VEGF, FGFB, TGFB, MCSF, PDGFBB, IL7, GMCSF, IL12P40, IL8, SCF, GCSF, CD40L, MIP1B, IL12P70, RESISTIN, IFNB, RANTES, TNFA, MCP1, IL17F, ENA78, IL1RA, IL10, IP10, IL13, IL1A, IL15, ICAM1, TNFB, IL6, MCP3, VCAM1, and FASL) available for all 1001 subjects were used and ex vivo signaling responses to cytokine stimulation data (84 different cytokine-cell-phosphoprotein combinations) available for a total of 818 subjects were used. For the development of a signature that differentiates each immunotype, prediction analysis of microarrays (PAM) was used to create a classifier in a training set with subsequent validation in a test set. Prediction analysis of microarrays is a statistical technique that create a phenotype-specific "nearest shrunken centroid" for classification, and thus can be used to compare the levels of each immune feature across immunotypes. This is done by a balanced 10-fold cross-validation in a training set, which enables one to choose a threshold that minimizes classification errors. This method makes one important modification to standard nearest centroid classification; it "shrinks" each of the immunotype centroids toward the overall centroid for all immunotypes, which confers an advantage since it makes the classifier more accurate by reducing the effect of noisy features. The comparison in the levels of serum proteins or signaling responses of specific immunotypes (e.g., those associated with older ages (13, 14 and 16)) was done by self-contained test of modified Fisher's combined probability (Dai et al., 2014) on the raw data.

Clinical analysis of immunotypes: For each disease, a logistic regression model penalized with 11 penalty was fit using predictors: gender, age, BMI and dummy variable for an immunotype. The training procedure for the penalized logistic regression used cross-validation over 3 folds to select the weight of 11 penalty. In order to assess the significance of the model's parameters, a permutation test was performed. Disease assignments to patients 1000 times were permuted. For each such permutation, the same fitting procedure was used to obtain the penalized logistic regression weights. It was assessed how often the weights learned on the real data exceeded, in absolute value, the weights computed on the permuted data. The frequency of this occurrence as empirical p-value was reported.

Metabolic gene modules analysis: A module analysis is performed on the metabolic genes from a sub-cohort of 394 patients. There were 851 genes that overlapped with the metabolic gene set (Possemato et al., 2011). Agglomerative clustering was used with 50 clusters on the standardized log-transformed metabolic gene expression levels. For each cluster, the Spearman's correlation coefficient was calculated and p-value was obtained between all the gene expression level and patients' age.

Guided Auto-Encoder (GAE) and SCI: When dealing with the data with a large number of dimensions, a goal was to find reasonable way to summarize the data possibly to a compact representation. This compact representation can be further used for feature extraction, visualization, or classification purpose. To obtain the informative representation, a novel model called "Guided Auto-Encoder" was proposed. It is built based on Auto-Encoder with a combined objective. Auto-encoders use a non-linear transformation of the data. Hence, it can model more complex processes (Bengio, 2009). One problem of auto-encoders is re-parameterization. With different initialization, it could have different results. Among the different types of visualizations with similar summarization level, one usually wants a representation that is informative of a specific target. Hence, A representation with two focuses can be constructed: 1) the learned compact representation h can be recovered to the original data as much as possible (reconstruction loss); 2) the learned compact representation should be as informative of the desired target as possible (prediction loss). Therefore, a novel structure—guided-auto-encoder—that balances the two objectives in order to provide an informative representation was proposed. The GAE to extract SCI was applied. It is a non-linear transformation of the cytokine data in a person that both approximates the true age, while preserves the information of the cytokine level.

Auto-encoder: Given the input data vector x, an auto-encoder aims to reconstruct the input data vector x. An auto-encoder with L encoding layers and L decoding layers has depth of L were considered, and each layer has fixed number of hidden nodes m.

For convenience, the input layer is defined as $h_0(x)=x$, and the output of lth hidden layer is defined as $h_l(x)$. The number of nodes in layer 1 is mi. The input into the lth layer of the network is defined as:

$$a_l(x)=h_{l-1}(x)^T W_l + \beta_l,$$

where $W_l$ is a real value weight matrix of $m_{l-1}$ by $m_l$ and $\beta_l$ is a vector of length $m_{l-1}$. The output of lth hidden layer is:

$$h_l(x)=\tan h(a_l(x))$$

where tan h is the hyperbolic tangent function:

$$\tanh(x) = \frac{1 - e^{-2x}}{1 + e^{-2x}}$$

The output of the Lth layer $h_L(x)$ as the coding layer was defined. The decoding layers are from L+1 to 2L−1 layer with the same setting. Finally, a linear output layer is on top of the last decoding layer:

$$f_{AE}(x)=h_{2L-1}(x)^T W_{2L-1} + \beta_{2L},$$

Given data vectors x, an auto-encoder was trained, the reconstruction loss on the data was minimized:

$$\text{minimize}_\theta \sum_i \|f_{AE}(x^i, \theta) - x^i\|_2^2 + \lambda \|\theta\|_2^2$$

where i ranges of the number of samples, $\theta$ represents all the parameters used in the auto-encoder, and $\lambda$ is the weight decay penalty used for regularization. To optimize the objective (1), a stochastic optimization method ADAM [3] was used.

Guided-Auto-encoder: A guided auto-encoder aims to reduce both the reconstruction loss and predictive loss. Given the input x, a side-phenotype y and an auto-encoder $f_{AE}$, the guided-auto-encoder incorporates a predictive function on the coding layer:

$$f_G(x)=h_L(x)^T w_G + \beta_G,$$

with its own set of parameters $w_G$ and $\beta_G$

Let $\theta$ be the set of all parameters of a GAE, the training objective is:

$$\text{minimize}_\theta \Sigma_i (\alpha \|f_G(x^i,\theta)-y^i\|_2^2 + (1-\alpha)\|f_{AE}(x^i,\theta)-x^i\|_2^2) + \lambda\|\theta\|_2^2, \quad (2)$$

where $\alpha$ is a real value number between 0 and 1 that is called the guidance-ratio. An example guided-auto-encoder with depth 2 and width 3 is shown below.

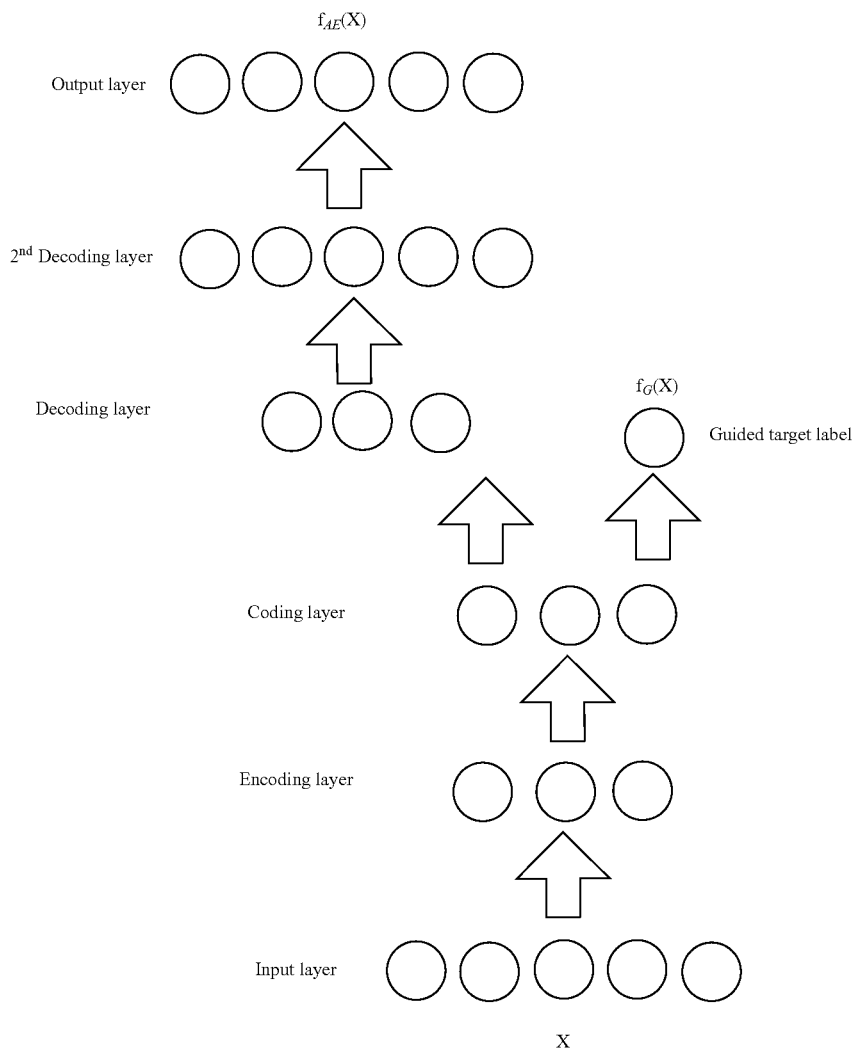

Optimization method ADAM (Kingma and Jimmy, 2014) was used to minimize objective. By choosing different guidance-ratio, different level of balance can be reached between prediction loss and reconstruction loss.

Extraction of SCI: In order to provide a marker summarization of a patient's immune system health state, a novel quantity—SCI was invented. This quantity is age of patient predictable from the state of the immune system. In order to obtain this quantity cytokine measurements were focused on. By construction, the SCI is a non-linear function of cytokine measurements, but also an estimate of the patient's true age.

To construct this quantity, Guided Auto-Encoder (GAE), which was aimed to compactly represent cytokine measurements and predict side-phenotype chronological age, was used. The best code length was identified, among lengths from 1 to 10, using a five-fold-cross-validation. The length of code k, whose performance was not statistically significantly worse than that of longer codes (paired t-test p-value>0.05) was selected. Within each fold nested three-fold cross-validation was performed to select hyper-parameters (depth, weight decay and guidance-ratio).

After obtaining the best code length as 5 (FIG. 10A), the five-fold-cross-validation was used to select the best hyper-parameter setting (depth=2, guidance-ratio=0.2, L2=0.001) on all GAE with code length 5. Finally, the GAE was trained on the whole dataset with the selected best hyper-parameter setting, and obtained the predictive function as the SCI predictor.

Data and Software Availability

Data availability: The cell subpopulation, immune protein and cell signaling data for the Stanford Aging and Vaccination studies are publicly available on ImmPort Bioinformatics Repository under the following study IDs SDY311 (cytokines, phosphoflow assays and CYTOF® surface phenotyping), SDY312 (cytokines, phosphoflow assays and flow cytometry surface phenotyping), SDY314 (flow cytometry surface phenotyping), SDY315 (cytokines, phosphoflow assays and CYTOF® surface phenotyping) and SDY478 (cytokines and CYTOF® surface phenotyping).

The gene expression data for the chronic fatigue syndrome control samples are available on gene expression omnibus (GEO) under Results Study design of the 1000 Immunomes Project During the years 2007 to 2016, ambulatory subjects (N=1001) (339 males and 662 females) from age 8 to >89 were recruited at Stanford University (the 1000 Immunomes Project; 1KIP) for a longitudinal study of aging and vaccination (Blazkova et al., 2017; Brodin et al., 2015; Furman et al., 2017; Furman et al., 2014; Furman et al., 2013; Furman et al., 2015; Price et al., 2013; Roskin et al., 2015; Shen-Orr et al., 2016; Wang et al., 2014), and for an independent study of chronic fatigue syndrome (Montoya et al., 2017) from which only healthy controls were included. Inclusion and exclusion criteria can be found under STAR Methods section. For all samples of the 1KIP, deep immune phenotyping was conducted at the Stanford Human Immune Monitoring Center (HIMC), where peripheral blood specimens were processed and analyzed using rigorously standardized procedures (Maecker et al., 2012). Whole blood was utilized for whole-genome transcriptomic analysis (N=394); serum samples were obtained and used for protein content determination (including a total of 50 cytokines, chemokines and growth factors) (N=1001) and for serological assessment of cytomegalovirus positivity (N=748), a major determinant of immune system variation (Brodin et al., 2015; Furman et al., 2015). Peripheral blood mononuclear cells or whole blood samples were used for determination of cellular phenotypes and frequencies (N=935), and for investigation of in vitro cellular responses to a variety of cytokine stimulations (N=818). Extended clinical report forms were collected from 617/1001 subjects, of which 231 were males and 386 were females (FIG. 1 and Table 1).

FIG. 1 depicts the 1000 Immunomes Project study design including the systematic analysis of immune systems via 'OMICS' approaches. The Stanford 1000 Immunomes Project consist in 1001 ambulatory subjects age 8 to >89 (34% males, 66% females) recruited during the years 2007 to 2016. For all samples of the 1KIP, deep immune phenotyping was conducted at the Stanford Human Immune Monitoring Center, where peripheral blood specimens are stored and analyzed using standard procedures. Peripheral blood samples are obtained from venipuncture and peripheral blood mononuclear cells or whole blood samples are used for determination of cellular phenotypes and frequencies (N=935) and for investigation of in vitro cellular responses to a variety of cytokine stimulations (N=818), serum samples were obtained and used for protein content determination (including a total of 50 cytokines, chemokines and growth factors) (N=1001) and whole blood is utilized for whole-genome transcriptomic analysis (N=394). Clinical characterization was assessed via clinical questionnaire in a total of 617 subjects, of which 527 could be analyzed since they completed the full set of 53 clinical items. From a total of 97 healthy young and older adults, comprehensive cardiovascular phenotyping was also conducted. Data for the 1000 Immunomes Project ("1KIP") are shown in Table 1.

TABLE 1

Available data for the 1KIP.

| | # Features | Sample size |
|---|---|---|
| Cell subsets | 25 | 935 |
| Immune proteins | 50 | 1001 |
| Gene expression* | 6149 | 394 |
| Cell stimulations | 84 | 818 |
| Latent CMV | 1 | 748 |
| BMI | 1 | 724 |
| Clinical questionnaire | 57 | 513 |
| Cardiovascular phenotyping | 37 | 97 |

*low variant genes removed

Distribution of Immune Cell Subpopulations and Circulating Proteins

With the purpose of finding immune 'metrics' of health, the distribution in the level of 50 circulating proteins and in the frequency of 25 major immune cells from peripheral blood was characterized. Distributions are important statistical features of a sample as they describe the observed frequency of occurrence of a given immune trait in the population studied. To do so, for each immune feature 6 different distributions were fit: Normal, Laplace, Log Normal, log-Laplace, Gamma and log-Gamma, using the maximum likelihood estimation (MLE) method, a robust estimator of probability distributions widely used in population studies (Johansen and Juselius, 1990). To identify the model that best explains each immune feature's distribution, 5-fold cross-validation on the MLE test between the normal and each feature's distribution was performed. By this method, P-values were obtained and each immune feature distribution against a null model was determined (see Methods).

Figure 9:
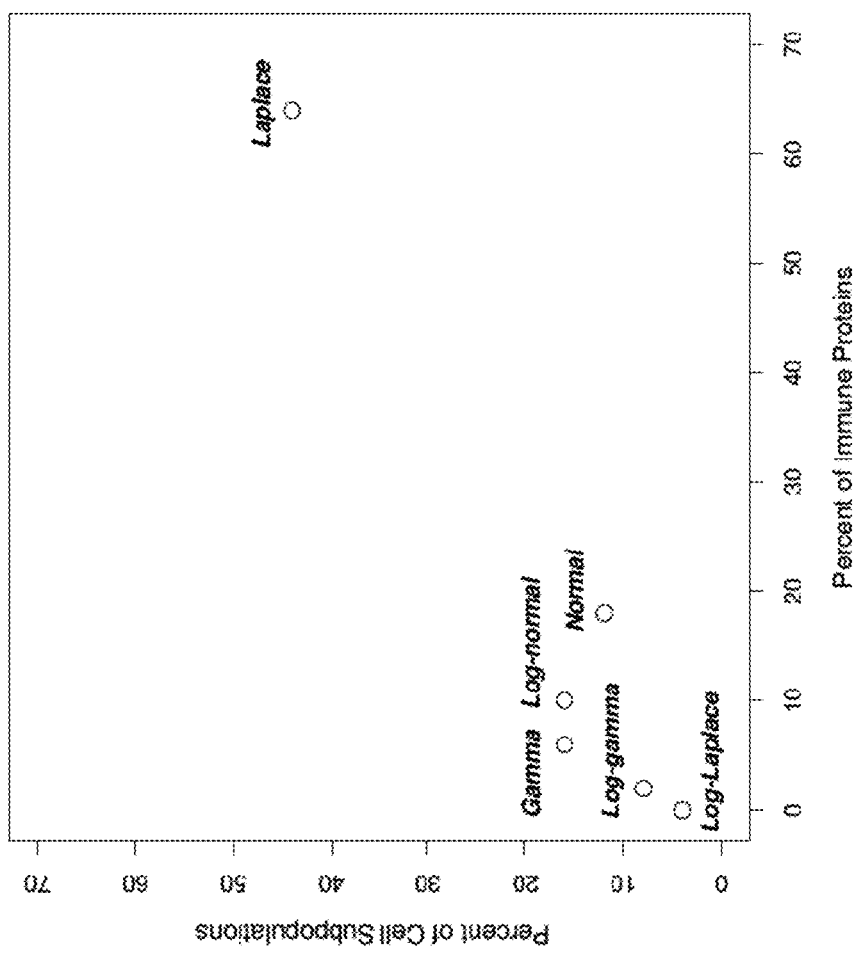
FIG. 9 depicts the proportion of distribution types for immune cell subsets and immune proteins. Serum protein mean fluorescence intensity and cell subpopulation frequency data were used to fit 6 different distributions (Normal, Laplace, LogNormal, log-Laplace, Gamma, log-Gamma) on each input feature using max likelihood estimation (MLE). To identify the best distribution for each feature, a 5-fold cross-validation test was performed for each distribution. A t-test p-value was calculated for the 5-fold test likelihoods between normal distribution and other distribution. Of a total of 75 immune features, a normal distribution is shown for only 12% (cell subpopulations) and 18% (for circulating proteins). The most common distribution is Laplace, followed by log-normal and gamma for cell subsets and normal and log-normal for immune proteins. The least common distribution for both immune feature types is log-Laplace.

Of the 75 immune features—cell subpopulations and circulating immune proteins—only 12 (16%) were normally distributed; 3/25 cell subpopulations (CD4+ T cells, CD8+ T cells, and naïve CD4+ T cells) and 9/50 (18%) for circulating proteins (FIG. 9 and FIG. 14). In general, the best-modeled distributions exhibited tails heavier than the normal distribution (such as Laplace, log-Normal and Gamma) (FIG. 9), which indicates that there is a large probability of finding subjects with extreme values for either cell frequencies or immune proteins. Most commonly, cell subpopulations exhibited a Laplace distribution (FIG. 9). For example, cell subsets exhibiting this type of distribution were the frequencies of B cells, and B cell subtypes IgG+ CD27+, IgG+CD27−, IgG− CD27+ and IgG− CD27−, transitional B cells; NK and NKT cells; central-memory CD4+ and CD8+ T cells; and effector-memory and naïve CD8+ T cells (FIG. 14). For circulating immune proteins, most of the chemokines also exhibited a Laplace distribution, whereas a normal distribution was found for the canonical inflammatory cytokine IL-1β, and a log-normal distribution was found for IL-6 and TNF-α.

Collectively, these results demonstrate that for the vast majority of blood immune cells and proteins heavy-tailed distributions are more common than normal ones, which indicates that extreme values are relatively common in the immune systems of human populations, in agreement with prior literature (Kaczorowski et al., 2017).

Identification of Immunotypes

The cell is the quanta of the immune system, hence, the proportion and activity of immune cells orchestrates the initiation and outcome of an immune response, as well as the ability to resolve it bringing the system back to homeostasis. To identify clusters of individuals sharing a similar immune make up and further associate this to health versus disease states, cell proportion data available from 935/1001 subjects was utilized. The data consisted of 721 samples that were analyzed using mass cytometry, and 213 that were analyzed flow cytometry (FIG. 15). To maximize statistical power by leveraging the relatively large sample size of the study, the total number of cell types that were commonly measured in both cohorts were used. This yielded a total of twenty-five cell subpopulations, which were consistently measured in all 935 subjects. The data were normalized and regression analysis on the data source was conducted so that the linear correlation between each feature and the data source was zero (see Methods). Clustering analysis was conducted using agglomerative clustering on the processed data. To identify significant clusters, gap-statistic was used. Gap-statistic is a well-established method (Tibshirani et al., 2001) that utilizes bootstrapping to create a "null" distribution against the within cluster dispersion of the formed clusters is compared, thus enabling estimation of the statistical significance of each cluster. Using one thousand bootstraps, the best number of clusters was 16. Principal component analysis (PCA) on the original data showed that the first three PCAs revealed most of these clusters although some clusters were not well separated by the first three PCAs, as they might differ in another projection.

Sixteen distinct immunotypes may be identified using immune cell proportions. Cell subset frequencies (N=25) were consistently obtained from a total 935 subjects. Based on the proportion of each cell type, individuals are clustered using agglomerative clustering. To derive significant clusters the gap-statistic was used (Tibshirani et al., 2001). 1000 bootstraps were performed to create a "null" distribution against the within cluster dispersion of the formed clusters was compared.

The average sample size for the immunotypes was 58; however, the number of subjects for each cluster varied significantly, with some clusters having a few dozens of samples (e.g., immunotypes 2, 10 and 11), while others had over a hundred samples (e.g., immunotypes 4 and 7).

Demographic characterization of these 16 immunotypes showed large variation in subjects' chronological age across immunotypes, which is not surprising given the strong well known age effect on cell subset frequencies (Shen-Orr and Furman, 2013). For example, most subjects in immunotypes 3, 4, 8, 10 and 12 were young and mid-aged subjects (average age 23, 33, 23, 34 and 36 years old respectively), whereas immunotypes 1, 2, 5, 6, 9 and 11 corresponded to mid-aged and older subjects (average age 50, 53, 52, 50, 49, and 49, respectively) and immunotypes 13, 14 and 16 were mostly comprised by older adults (average age 60 years and above). Interestingly, a large age variation was also observed within immunotypes; notably, those associated with older ages (e.g., immunotype 13 and 16) also included groups of younger adults suggesting that, in humans, specific combinations of cell proportions associated with aging can also be found in young healthy adults.

The average BMI was similar across immunotypes (mean: 25.9, range: 24.7-29.4); however, within immunotypes a large individual variation was found (range: 13.1-52.1).

Varying rates of CMV seropositivity across immunotypes were observed with incidences significantly higher than the study cohort (53%) in some immunotypes (e.g., immunotypes 11 (78%) and 14 (72%)) and significantly lower for others (e.g., immunotypes 3 (32%) and 13 (35%)) (P<0.05). Similarly, with respect to the sex of the individuals in the cohort, some immunotypes were enriched for males compared to the average male sex rate for the entire cohort (34%) (e.g., immunotypes 6 (54%) and 10 (59%)) while others enriched for females (e.g., immunotypes 3 (81%), 9 (76%) and 12 (81%)). Since a large BMI variance was observed for most immunotypes and it is well known that obesity can influence immune system responses and general health, BMI was included as a covariate for the follow-up associations and analysis. Similarly, broad sex effects have been observed in the human immune system (Blazkova et al., 2017; Furman et al., 2014) and CMV infection has been demonstrated to dramatically influence immune system function. Thus, in addition to including age and BMI as covariates, the follow-up clinical analyses of the immunotypes were adjusted for sex and CMV.

Immune Characterization of Immunotypes

To characterize the immunotypes with respect to their levels of inflammation and immune cell capacity to respond to acute challenges, immune protein data (50 cytokines, chemokines and growth factors) available for all 1001 subjects and ex vivo signaling responses to cytokine stimulation data (84 different cytokine-cell-phosphoprotein combinations) available for a total of 818 subjects (Table 1) were used. Analysis was computed using prediction analysis of microarrays (PAM) (Tibshirani et al., 2002), a statistical technique that compares the levels of each immune feature across immunotypes by using nearest shrunken centroid (see Methods). This method makes one important modification to standard nearest centroid classification; it "shrinks" each of the immunotype centroids toward the overall centroid for all immunotypes, which makes the classifier more accurate by reducing the effect of noisy features (see Methods). For most cases, each immunotype exhibited correlated levels of immune proteins, i.e., if for a given immunotype, a cytokine was found in higher or lower levels with respect to all other immunotypes, most cytokines tended to change in the same direction; and a similar phenomenon was observed for signaling responses. More potent responses in immunotypes with lower levels of circulating immune proteins and vice versa were observed, thus indicating concerted responses to acute immune challenge and a negative effect of systemic inflammation, in agreement with recent data from Fourati S, et al. (2016) (Fourati et al., 2016), Shen-Orr, et al (2016) (Shen-Orr et al., 2016), and Verschoor C P, et al (2017) (Verschoor et al., 2017) showing that inflammatory markers are negative predictors of the acute response to immune challenges.

The levels of circulating immune proteins in the immunotypes associated with older ages (13, 14 and 16) were higher than those observed in all other immunotypes (combined P<0.01), which is consistent with the well-known phenomenon of low-grade chronic inflammation observed in older adults. In general, immunotypes associated with young and mid-aged subjects (types 3, 4, 8, 10, and 12) exhibited protein levels no different from the average study cohort, with the exception of type 12, which had significantly higher levels of cytokines compared to all others (P<0.01) and included a small group of older adults aged 60+(N=11).

These findings indicate that in the general population there are groups of individuals chronologically young and immunologically more similar to older ones (which is the case of the young adults from immunotypes 13 and 16) and subgroups of older adults that cluster with younger ones (e.g., in immunotype 12), who despite exhibiting high inflammatory levels, have signaling responses to cytokine stimuli that are preserved.

Clinical Characterization of Immunotypes

Figure 2:
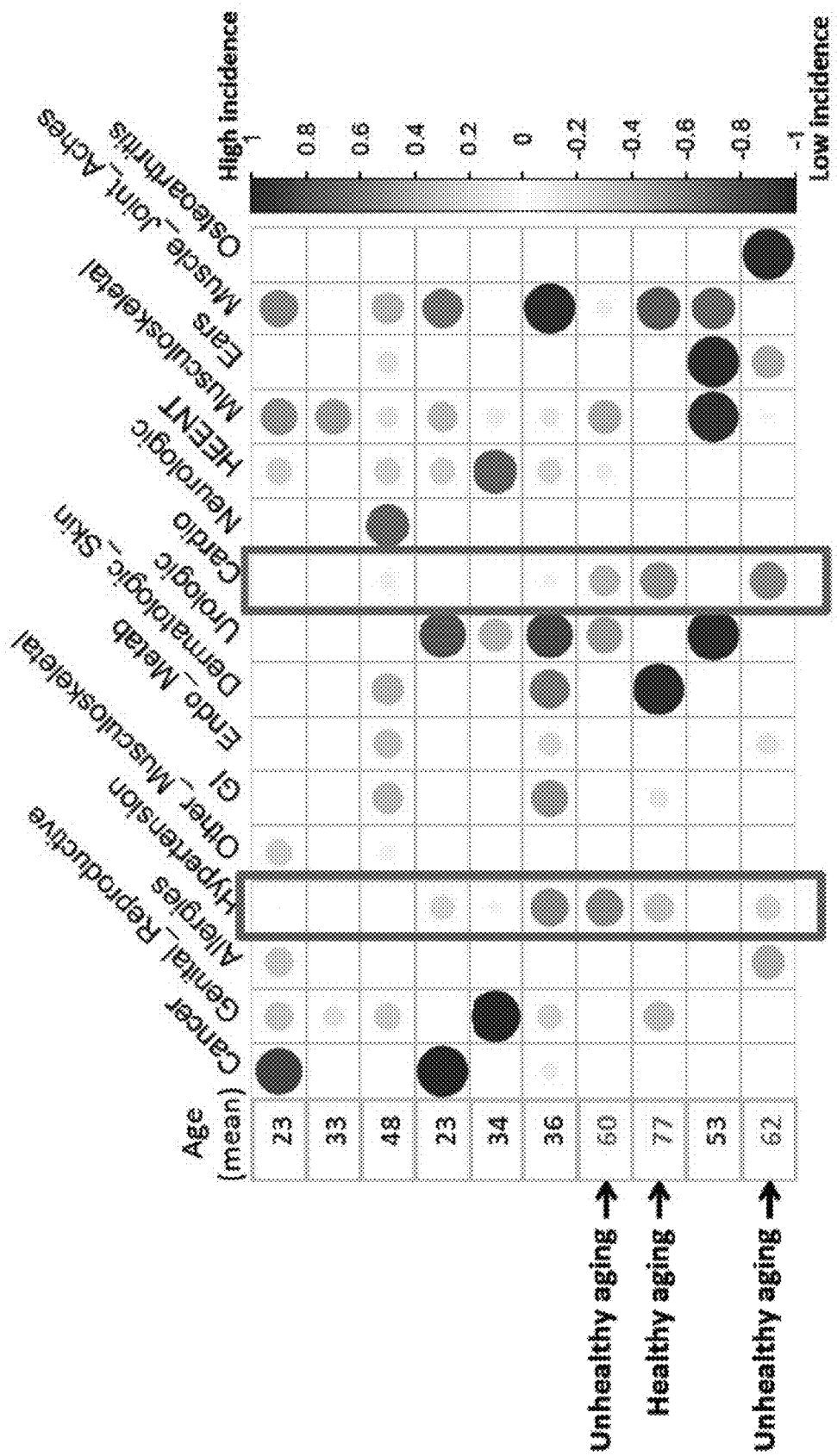
FIG. 2 depicts the clinical characterization of immunotypes. A map for immunological health and disease was derived from immunotype and clinical data (encompassing 53 disease features) obtained from a total of 527 subjects. Significant correlations are shown for a total of 16 of such disease features (age, sex, CMV and BMI-adjusted, P<0.05). A low incidence of cancer and other age-associated conditions such as those involving bone, muscle and joints is shown for immunotype 3 (average age 23, age range 8-52) compared to all other immunotypes. In contrast, immunotype 8 (average age 23, age range 12-79) despite exhibiting a low incidence of cancer and hypertension, a high incidence of musculoskeletal conditions such as muscle and joint aches, as well as for urologic system disease are observed. Immunotype 12, composed mostly of young adults subjects but sharing immune cell profiles with a small group of older ones (see FIG. 3), are mostly protected from disease except for those of muscle and joints (P<0.001), and a low but significant incidence of cancer (R=0.09, P<0.05). Different disease patterns are observed for the age-associated immunotypes 13, 14 and 16. Individuals in immunotype 13 (average age 60, age range 16-90) have a high incidence of hypertension and cardiovascular conditions and low incidence of urologic and musculoskeletal conditions, whereas those in immunotype 14 (average age 77, age range 29-90) have a low incidence of hypertension, cardiovascular disease, gastrointestinal disease and muscle-joint pain, and a high incidence of genital and reproductive conditions (higher than the study cohort). Immunotype 16 (average age 60, age range 9-90) shows a high incidence of hypertension and cardiovascular conditions, as well as high incidence of ear disease and osteoarthritis, and lower incidence of allergies and endocrine-metabolic conditions. Based on the clinical relevance of cardiovascular disease, the age-associated immunotypes 13 and 16 are classified as "unhealthy aging immunotype" (UAiT) and immunotype 14 as "healthy aging immunotype" (HAiT).

To determine the clinical impact of the immunotypes, a map relating each immunotype with disease states was derived from clinical questionnaires (totaling 53 disease features) (FIG. 16) consistently obtained from 527/617 participants belonging to immunotypes 3, 4, 7, 8, 10, 12, 13, 14, 15 and 16 (FIG. 2). Significant correlations were observed for a total of 16 of such disease features (age, sex, CMV and BMI-adjusted, P<0.05). As expected, low incidences of cancer and other age-associated conditions such as those involving bone, muscle and joints were observed for immunotype 3 (average age 23, age range 8-52) compared to all other immunotypes. However, in subjects from immunotype 8 (average age 23, age range 12-79) despite exhibiting a low incidence of cancer and hypertension, a positive correlation was found for musculoskeletal conditions such as muscle and joint aches, as well as for urologic system disease (FIG. 2). Interestingly, immunotype 12, composed mostly of young subjects but sharing immune profiles with a small group of older ones, were mostly protected from disease including those associated with the genital and reproductive system, and the gastrointestinal, endocrine-metabolic, dermatologic and urologic systems. Despite these observations, subjects in immunotype 12 had, on average, a high incidence of muscle and joint aches compared to all other immunotypes (P<0.001) and a low but significant incidence of cancer (R=0.09, P<0.05).

Immunotypes 13, 14 and 16 were studied next. Immunotypes 13, 14, and 16, which were composed mostly of older adults age 60 and over, but had differing pattern of disease incidence. For example, subjects in immunotype 14 (average age 77, age range 29-90) had a low incidence of gastrointestinal conditions and muscle-joint pain but a relatively high incidence of genital and reproductive disease (higher than the study cohort) (FIG. 2). In contrast, individuals in immunotype 13 (average age 60, age range 16-90) exhibited a relatively low incidence of urologic and musculoskeletal conditions, whereas type 16 (average age 60, age range 9-90) showed a high incidence of ear disease and osteoarthritis.

With respect to more relevant age-related diseases associated with mortality such as cardiovascular diseases, subjects in both immunotypes 13 and 16 had a high incidence of such conditions including high rates of hypertension and other cardiovascular conditions, whereas those in type 14 were protected from these diseases. The age-associated immunotype 14 was classified as "healthy aging immunotype" (HAiT), and immunotypes 13 and 16 were classified as "unhealthy aging immunotype" (UAiT). Collectively, these results demonstrate that clustering individuals in immunotypes based on the profiles of cell subpopulation frequencies can inform about the importance of the immune system in various diseases and in the maintenance of human health.

Construction of SCI

Given the increasingly recognized effect of low-grade systemic and chronic inflammation in the development of a wide variety of diseases associated with older age especially in the field of cardiovascular disease (Furman et al., 2017; Ridker et al., 2017), it was important to construct an metric that could summarize an individual's inflammatory levels. This type of inflammation is thought to ensue as a maladaptive reaction in response to exposure to tissue damage, metabolic dysfunction and environmental insults (collectively named as the "exposome") (Goldberg and Dixit, 2015; Kotas and Medzhitov, 2015). It is, therefore, different from the acute inflammatory response, which occurs in response to infections or trauma and is of high-grade and self-limiting. For acute inflammation, a number of standard markers have been validated and these include the acute phase protein, C-reactive protein, and potent inflammatory cytokines such as IL-1$\beta$, IL-6 and TNF-$\alpha$, among others. However, in age-related chronic inflammation, no standard biomarkers exist (Franceschi et al., 2017; Morrisette-Thomas et al., 2014). Thus, an unbiased approach to compactly represent the non-linear structure of the cytokine network was undertaken. To do so, a deep learning method called guided auto-encoder (GAE) was applied to circulating immune protein data encompassing a total of 50 cytokines, chemokines and growth factors from a total of 1001 subjects.

Figures 10A, 10B:
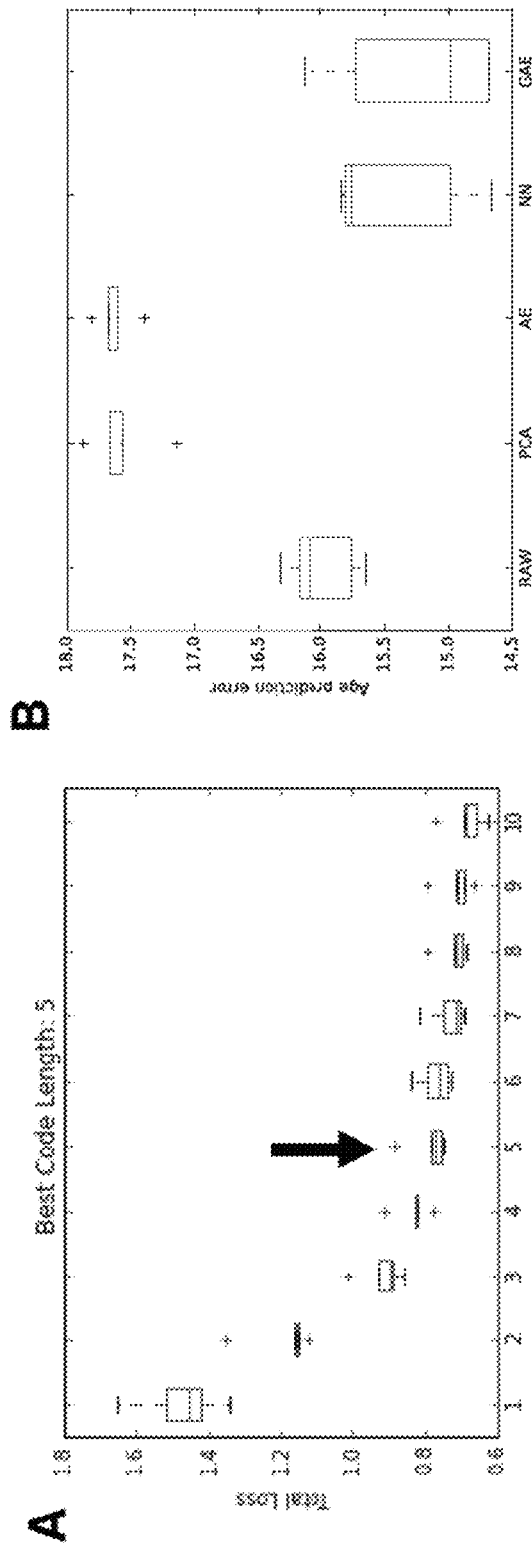
FIGS. 10A-10B depict the estimation of the GAE code length and accuracy of age prediction. 5-fold cross-validation was used to identify the best code length, among lengths from 1 to 10. The length of code k, whose performance was not statistically significantly worse than that of longer codes (paired t-test p-value>0.05) was selected. Within each fold nested 3-fold cross-validation was performed to select hyper-parameters (depth, weight decay and guidance-ratio). In our experiment, the best code length is 5 (a) as adding one more code (6) does not significantly improve the total loss (p-value=0.18). After obtaining the best code length as 5, the 5-fold-cross-validation was used to select the best hyper-parameter setting (depth=2, guidance-ratio=0.2, L2=0.001) on all GAE with code length 5. Finally, the GAE was trained on the whole dataset with the selected best hyper-parameter setting, and obtained the predictive function as the SCI predictor. The GAE method outperforms linear methods for protein data reconstruction and prediction of chronological age (b).
Figure 11:
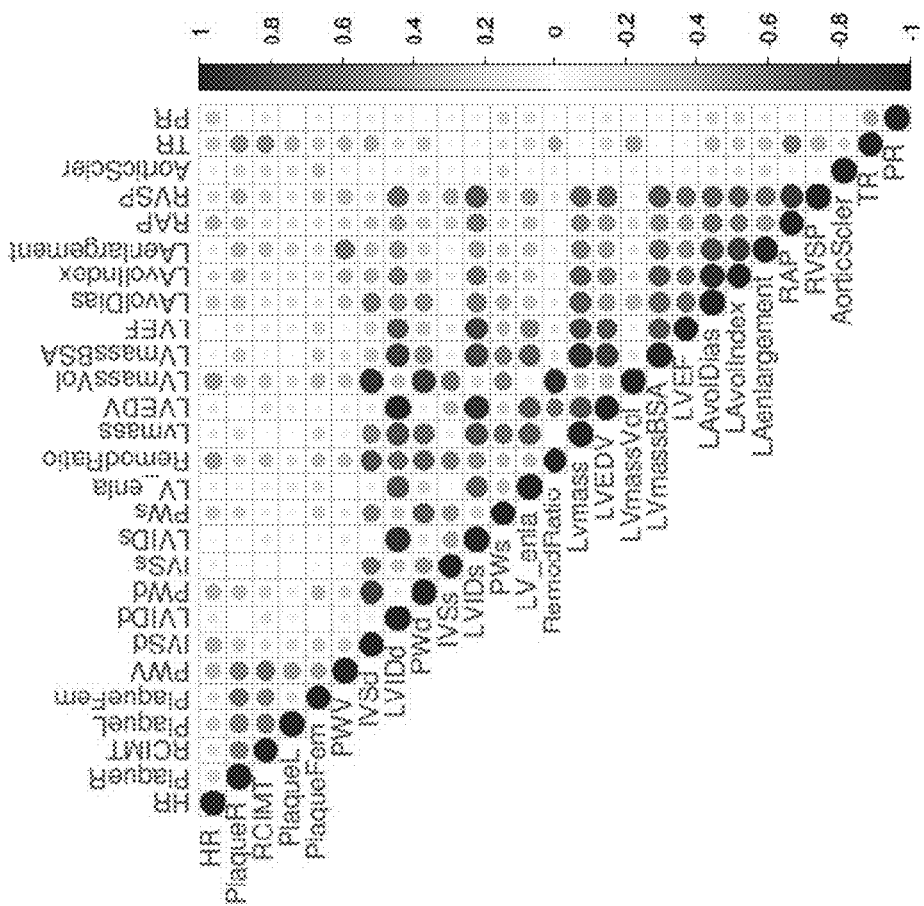
FIG. 11 depicts the correlation network of cardiovascular measurements. Cardiovascular assessment was conducted in a subset of study participants (N=40) using echocardiograms and non-invasive pulse—was velocity testing as a measure of arterial stiffness. A total of 27 measurements were collected. Correlation analysis shows high degree of positive correlation across measurements. HR: heart rate (in bpm), PlaqueR: significant presence of plaques in right carotid, RCIMT: right carotid intima-media thickness, PlaqueL: significant presence of plaques in left carotid, PlaqueFem: significant presence of plaques in femoral artery, PWV: Pulse-wave velocity, IVSd: interventricular septal diameter in diastole, LVIDd: left ventricular internal diameter in diastole, PWd: posterior wall thickness in diastole, IVSs: interventricular septal diameter in systole, LVIDs: left ventricular internal diameter in systole, PWs: posterior wall thickness in systole, LV_enla: left ventricular enlargement, RemodRatio: remodeling ratio, Lvmass: left ventricular mass, LVEDV: left ventricular end-diastolic volume, LVmassVol: left ventricular mass to volume ratio, LVmassBSA: left ventricular mass indexed to body surface area, LVEF: left ventricular ejection fraction, LAvolDias: left atrial volume in diastole, LAvolIndex: left atrial volume index, LAenlargement: left atrial enlargement, RAP: right atrial pressure, RVSP: right ventricular systolic pressure, AorticScler: aortic valve sclerosis, TR: tricuspid regurgitation, PR: pulmonary valve regurgitation.

In the GAE method, the original data are combined into a small number of 'codes' by a non-linear function. The method aims at eliminating the noise and redundancy in the data, yet retaining the most relevant information, such that a robust GAE model is able to accurately predict from the codes the original raw data (data reconstruction) (FIG. 10A-10B). In the analysis, the computational objective was to predict the original cytokine data and, in parallel, the individuals' chronological age (FIG. 10A-10B). The resulting predicted values are the result of a non-linear transformation of the cytokine data that both approximates the true age, while preserving the information at the cytokine level. Hence, the GAE-predicted age represents a given individuals' age in the inflammatory space, or "SCI". As the ability to predict the original cytokine input data is usually a function in the number of codes in the GAE method, first it was important to identify the best code length. To do so, a 5-fold cross-validation for each GAE of code length from 1 to 10 (FIG. 11) was used. In each fold, the best hyperparameters (depth, weight decay and guided ratio) using 3-fold cross-validation was used (see Methods). The error (total loss) for each model was calculated, as the sum of prediction loss (accuracy in predicting age) and reconstruction loss (accuracy in predicting cytokine data). Last, the GAE with the minimal code length such that the addition of a code did not significantly improve the total loss on all 5 folds (t-test p-value<0.05) was identified. Using this method, the best code length was 5 (FIG. 11A).

Figure 12:
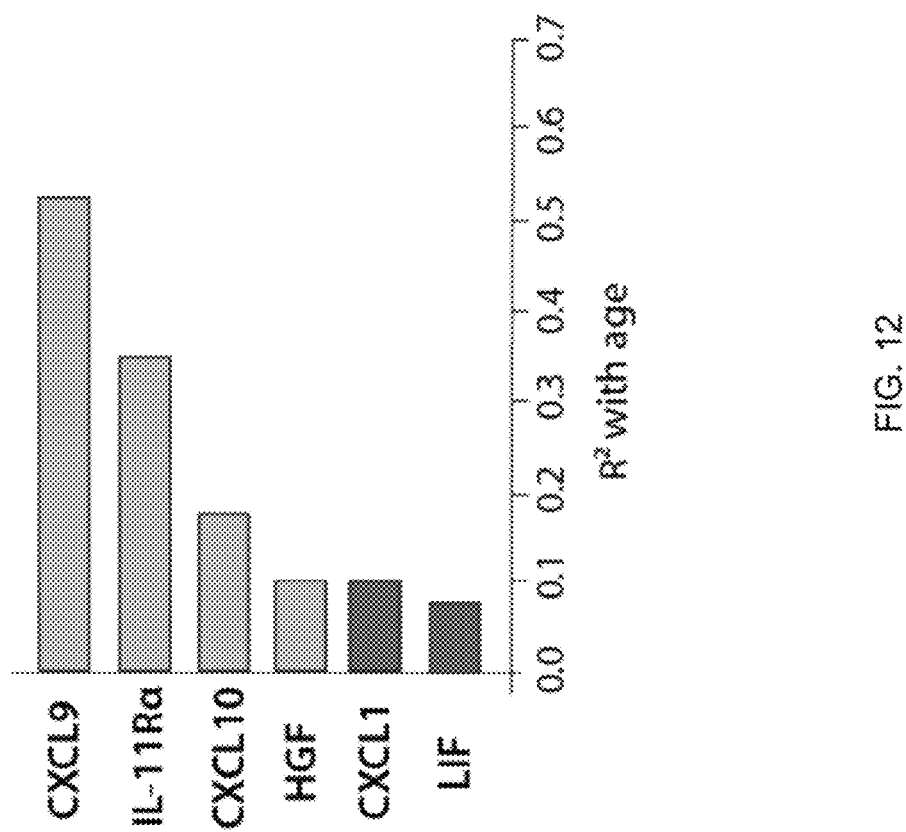
FIG. 12 depicts the expression of cytokines in healthy adults. Cytokines are significantly associated with aging in healthy adults. A follow-up study in a group of 97 healthy adults (age 25-90 years old) were selected form a total of 151 recruited subjects, using strict selection criteria (see Methods). From a total of 48 Inflammation markers measured, 6 were significantly correlated with age ($P<0.05$), including CXCL9, IL-11Rα, CXCL10 and HGF (which increased with age) and GRO-α and LIF, which decreased. Coefficient of determination ($R^2$) and P-values were obtained from regression analysis.
Figure 13:
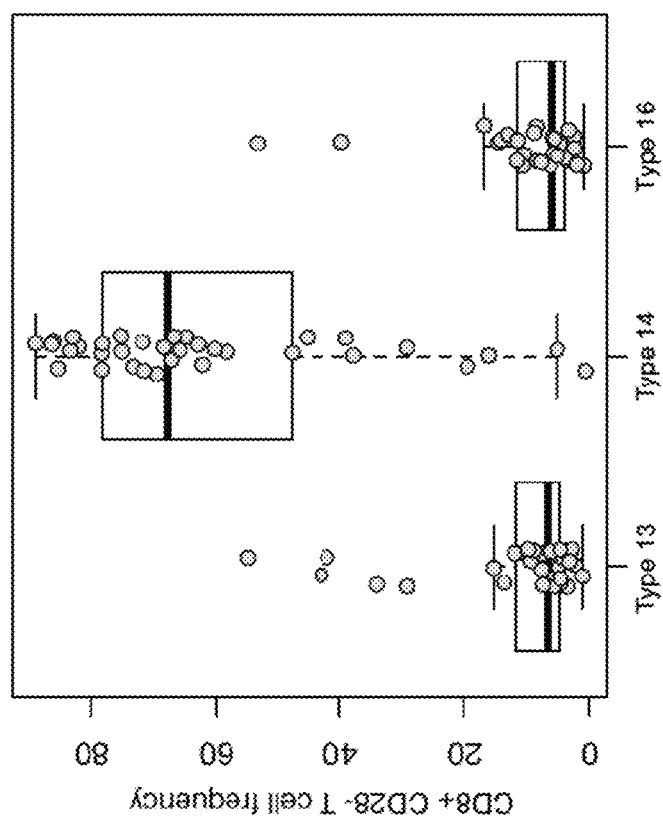
FIG. 13 shows CD8+CD28− T cell frequencies in age-related immunotypes. The frequency of the CD8+CD28− subset in available data for the aging immunotypes 13, 14 and 16 (N=95) was analyzed. A significant increase in this cell subpopulation is observed in immunotype 14 compared with immunotypes 13 and 16 ($P<10^{-10}$, by combined Student' t-test).

To test the robustness and quality of the GAE method, the accuracy of the age prediction was compared against other widely used dimensionality reduction methods that use linear equations, such as the elastic net and principal component analysis (PCA), as well as those involving non-linear equations, such as plain auto-encoders and neural networks (FIGS. 10A-10B and 11B). Overall, the GAE method outperformed other methods in predicting chronological age (P<0.05) with the exception of the comparison with a plain neural network (P=0.54) (FIG. 12B). These results indicate that the well-known phenomenon of low-grade chronic inflammation in aging humans is best modeled using non-linear methods, and based on these, one can derive a metric that accurately predicts chronological age while preserving the biological information related to the total inflammatory levels, as measured by the level of circulating immune proteins.

SCI is Correlated with Comorbidity and with Cardiovascular Aging

Figure 3A:
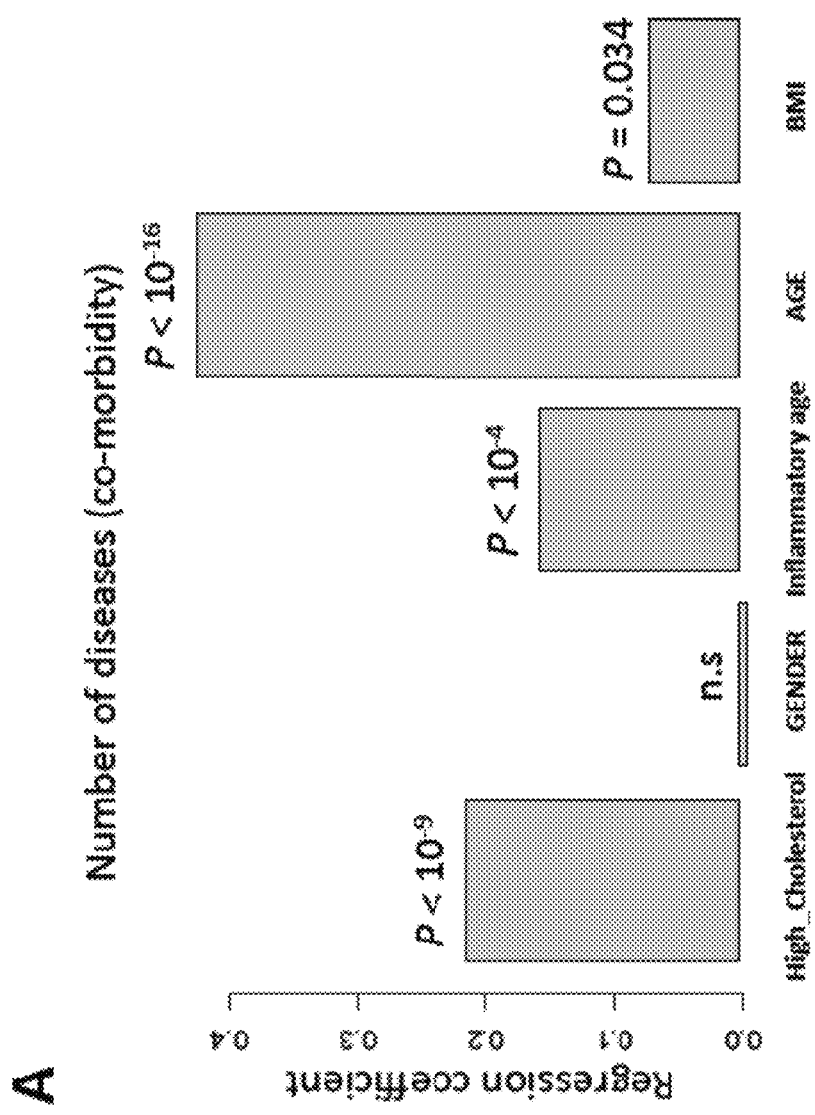
FIGS. 3A-3B depict the correlation between systemic chronic inflammaging (SCI) and comorbidity. Ten age-related disease items were selected to characterize the clinical significance of SCI derived from the analysis of 50 cytokines (N=1001), using the guided autoencoder method (see FIGS. 10A-10B and 12). The items analyzed included different diseases and physiological systems: cancer, cardiovascular, respiratory, gastrointestinal, urologic, neurologic, endocrine-metabolic, musculoskeletal, genital-reproductive and psychiatric. All these disease features were binary. A significant correlation between SCI and comorbidity in the studied population is observed (by regression analysis with permutations) between sum of disease (comorbidity) and SCI (N=527, P<0.0001). Covariates included age, BMI, sex, CMV and high cholesterol (also a binary category).
Figure 3B:
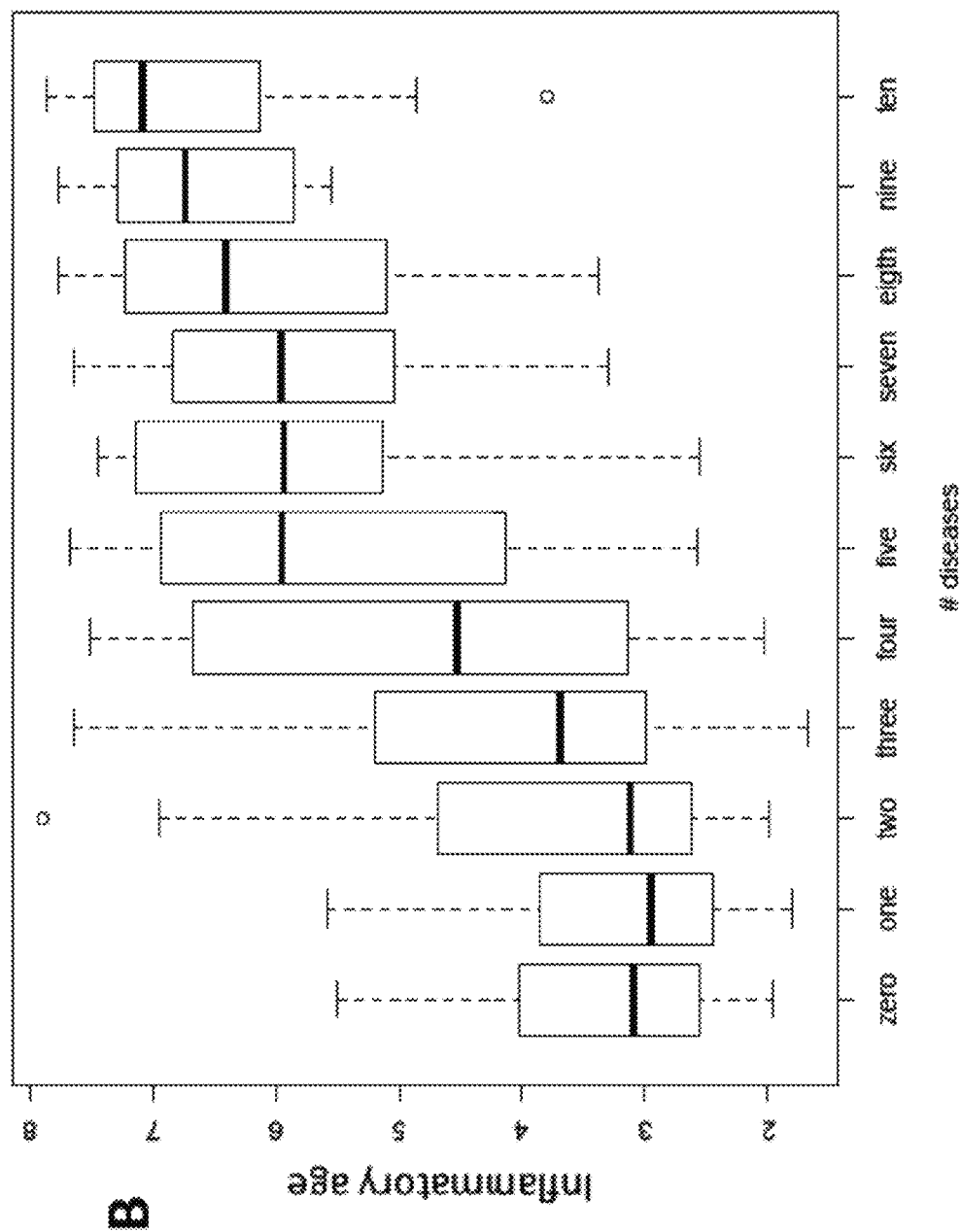

To gain further insights into the effect of chronic inflammation on age-related pathology, 10 disease items representing different physiological systems and generally associated with older age, and computed regression analysis between the sum of disease (comorbidity) and SCI were selected. The items analyzed were cancer, cardiovascular, respiratory, gastrointestinal, urologic, neurologic, endocrine-metabolic, musculoskeletal, genital-reproductive and psychiatric. All these disease features were binary. For these analyses, adjustments were made for age, BMI, sex, CMV and high cholesterol (also a binary category) (FIG. 3A), given the reported effect of each of these variables in the etiology of age-related pathologies. After controlling for multiple testing (by permutation tests) a significant correlation between SCI and comorbidity in the studied population (N=527, P<0.0001) (FIG. 3A) was observed.

Given the increasingly recognized effect of chronic inflammation in hypertension and other cardiovascular conditions, a total of 40 subjects aged 60 to >89 (20 healthy and 20 disease subjects) were selected for a follow-up study focused on cardiovascular aging. After recruitment, informed consent was obtained from all study participants, who were then subjected to baseline echocardiograms and pulse-wave velocity testing (see Methods) encompassing 27 variables. Correlation network analysis showed that many of these were positively correlated (FIG. 12), which was not surprising given that a number of these variables result from a calculation of two or more related echocardiogram measurements that are taken into consideration. For example, the remodeling ratio or relative wall thickness (RWT), a measure of ventricular remodeling and cardiovascular aging, can be calculated as the sum of the inter-ventricular septal dimension in diastole (IVSd) and posterior wall dimension in diastole (PWd) divided by the left ventricular internal dimension (LVIDd) (see Methods).

Figure 4:
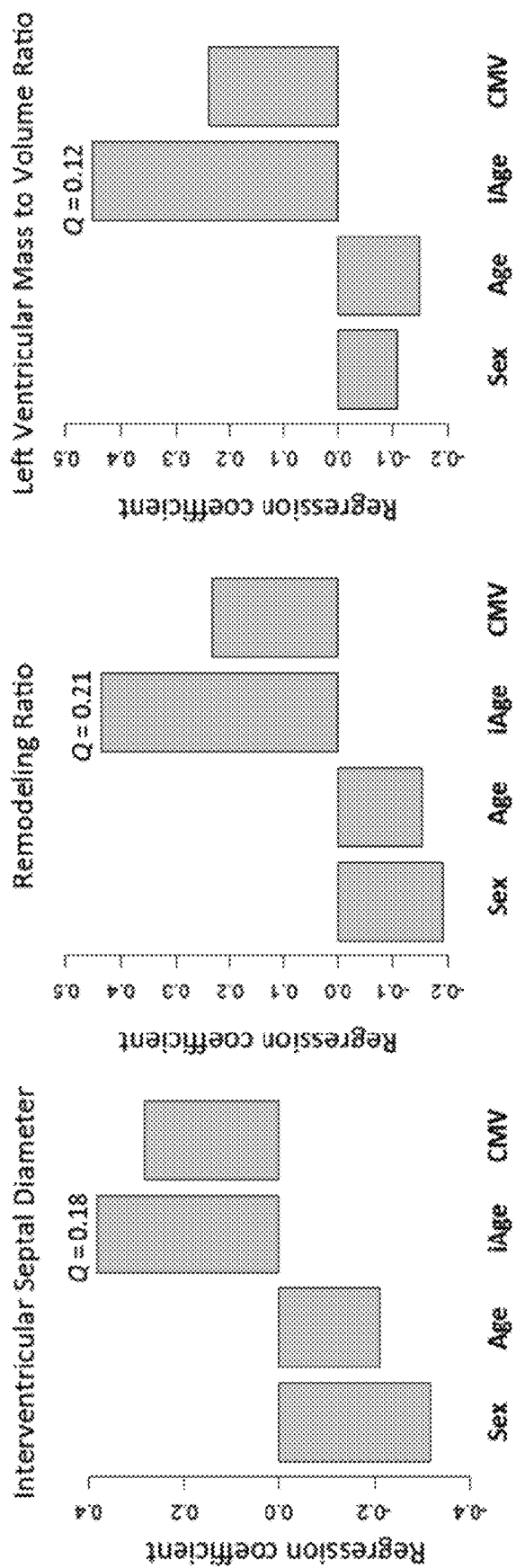
FIG. 4 depicts the correlation between SCI and cardiovascular aging. Forty older subjects (age 60→89) were selected for a study of cardiovascular aging. A total of 34 variables were measured by echocardiogram and non-invasive brachial-ankle pulse-wave velocity testing. Regression analysis with 500 permutations was conducted to obtain significance of each regression coefficient. Significant positive correlation (sex, age and CMV-adjusted) is observed for diastolic inter-ventricular septal dimension (IVSd) (Q=0.18), and left ventricular mass to volume ratio (LVmv) (Q=0.12). A borderline significant increase in relative wall thickness (RWT) is also shown (Q=0.21).

Regression analysis was computed and multiple hypotheses testing by permutation procedures was adjusted for, in order to obtain significance of the regression coefficients. Using 500 permutations, it was found that SCI was positive correlated with only two variables (FIG. 4): the diastolic inter-ventricular septal dimension (IVSd) (Q=0.18), and the left ventricular mass to volume ratio (LVmv) (Q=0.12). A positive correlation was also observed for relative wall thickness (RWT) although with a borderline significance (Q=0.21) (FIG. 4).

These results show that SCI is an important immune feature of age-related comorbidity and cardiovascular aging.

Figure 5:
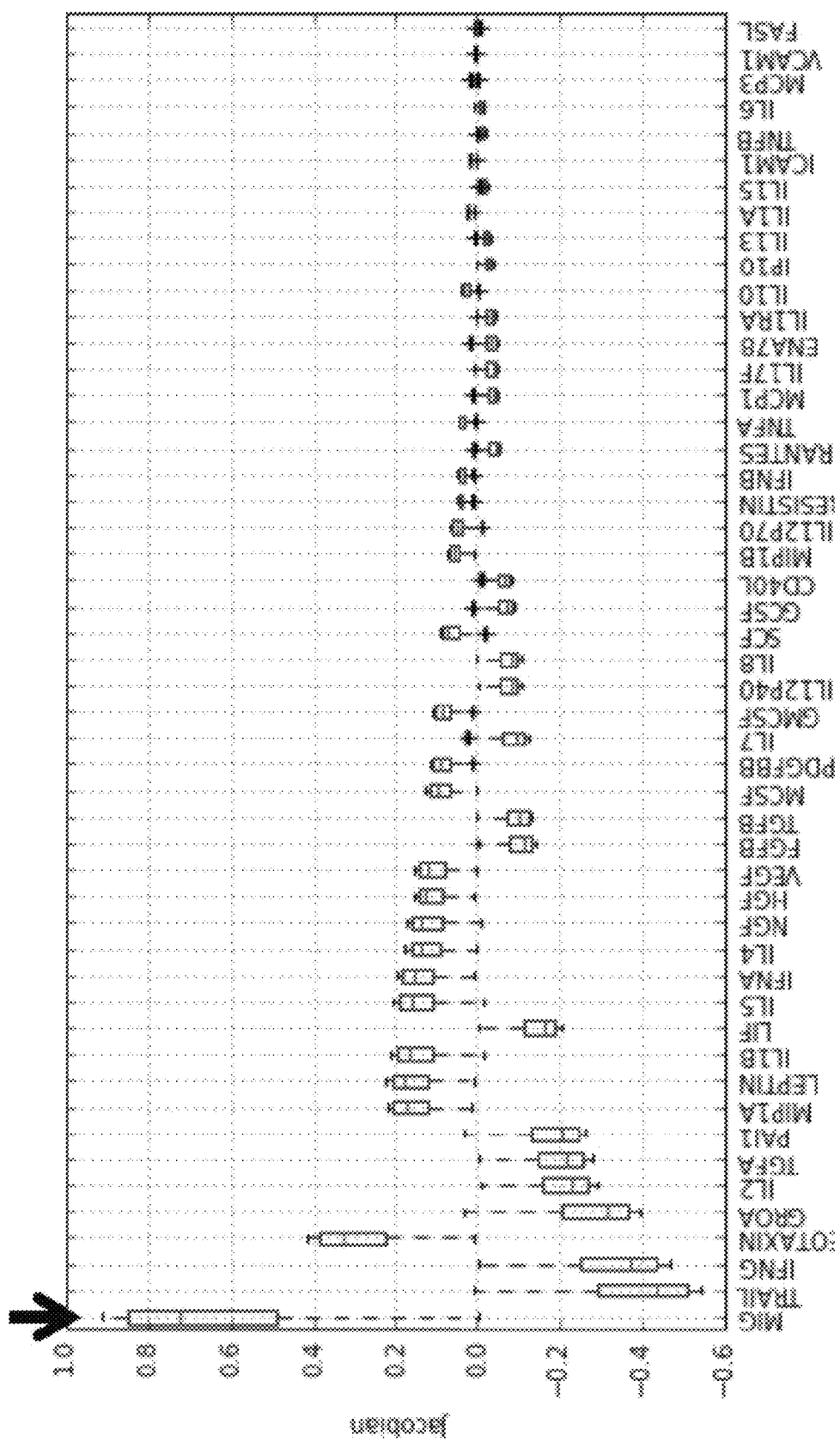
FIG. 5 depicts the decomposition of SCI. The decomposition of SCI reveals large contribution of the chemokine CXCL9. To gain further insights into the potential mechanisms by which inflammation relates to cardiovascular dysfunction, SCI was decomposed by computing the first order partial derivative of SCI with regards to each input feature (jacobian). Both positive and negative contributors to SCI are observed. The top 15 most variable jacobians are CXCL9, EOTAXIN, Mip-1α, LEPTIN, IL-1β, IL-5, IFN-α and IL-4 (positive contributors) and TRAIL, IFN-β, GRO-α, IL-2, TGF-α, PAI-1 and LIF (negative contributors).

CXCL9 is an Important Component of SCI and Correlates with Cardiovascular Aging in Healthy Adults To gain further insights into the potential mechanisms by which inflammation relates to cardiovascular dysfunction, it was a goal to analyze which factors contribute the most to SCI. To do so, SCI was decomposed into single immune protein features by computing the most variable jacobians (first order partial derivative of SCI). Positive and negative contributors to SCI (FIG. 5) were found. The top 15 most variable jacobians were CXCL9, EOTAXIN, Mip-la, LEPTIN, IL-1β, IL-5, IFN-α and IL-4 (positive contributors) and TRAIL, IFN-β, GRO-α, IL-2, TGF-α, PAI-1 and LIF (negative contributors) (FIG. 5).

To decouple the potential confounder effect of comorbidities from the previous findings showing that SCI is associated with cardiovascular aging (FIG. 4, see above), a follow-up study was conducted in a group of 97 healthy adults (age 25-90 years old) who were selected from a total of 151 recruited subjects, using strict selection criteria, and who were well matched for cardiovascular risk profiles (see Methods) (Table 2).

TABLE 2

Available data for the 1KP.

| | Group 1 (25 to 44 y) | Group 2 (45 to 59 y) | Group 3 (60 to 74 y) | Group 4 (75 to 90 y) | P |
|---|---|---|---|---|---|
| N | 21 | 32 | 25 | 19 | — |
| Age (mean) | 33 ± 6 | 53 ± 4 | 68 ± 4 | 82 ± 4 | <0.001 |
| Female (%) | 48 | 50 | 72 | 47 | 0.25 |
| SBP (mmHg) | 117 ± 12 | 118 ± 12 | 117 ± 14 | 123 ± 16 | 0.36 |
| DBP (mmHg) | 71 ± 6 | 74 ± 9 | 71 ± 9 | 69 ± 10 | 0.35 |
| Heart rate | 64 ± 9 | 58 ± 8 | 65 ± 12 | 62 ± 12 | 0 07 |
| BMI (kg/m$^2$) | 24 ± 3 | 25 ± 3 | 24 ± 3 | 23 ± 3 | 0.02* |
| Waist (cm) | 83 ± 10 | 88 ± 9 | 85 ± 8 | 89 ± 13 | 0.23 |
| Glucose (mM) | 4.9 ± 0.4 | 5.1 ± 0.6 | 5.0 ± 0.5 | 5.1 ± 0.5 | 0.20 |
| TC/HDL | 3 7 ± 1.4 | 3.4 ± 1.1 | 3.2 ± 0.9 | 3.0 ± 0.7 | 0 28 |
| Uric Acid | 5.6 ± 1.6 | 5.0 ± 0.97 | 4.8 ± 1.0 | 5.7 ± 1.7 | 0.14 |
| Calcium | 9.3 ± 0.3 | 9.2 ± 0.4 | 9.3 ± 0.4 | 9.2 ± 0.3 | 0.89 |
| TSH | 1.60 ± 0.80 | 1.50 ± 0.60 | 2.0 ± 0.8 | 2.0 ± 0.9 | 0.08 |
| SCr (mg/dL) | 0.80 ± 0.12 | 0.83 ± 0.12 | 0.80 ± 0.13 | 0.85 ± 0.18 | 0.54 |
| Cystatin C | 0.80 ± 0.14 | 0.85 ± 015 | 0.94 ± 0.16 | 1.08 ± 0.16 | <0.001 |
| Hs-CRP | 1.3 ± 1.3 | 1.7 ± 2.7 | 1.5 ± 1.8 | 1.1 ± 0.8 | 0.68 |

Inflammation markers were measured using a 48-plex panel, and aortic pulse wave velocity (PWV) and echocardiograms were obtained from all the study participants. Aortic PWV was calculated as the ratio of the pulse wave distance (in meters) to the transit time (in seconds) and RWT was calculated as stated previously (see Methods).

Figure 6A:
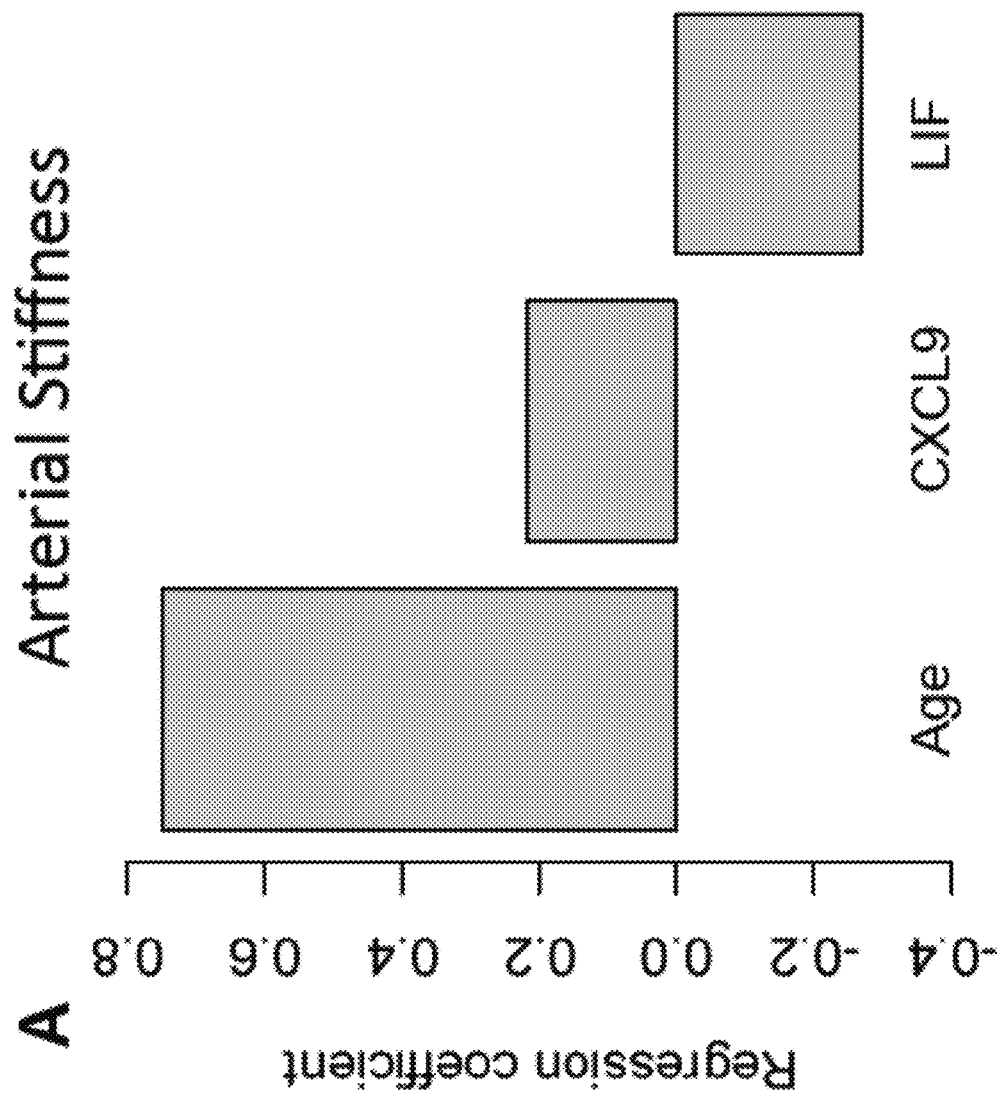
FIGS. 6A-6B depicts the prediction of cardiovascular aging based on markers. CXCL9 and LIF predict cardiovascular aging in healthy subjects independently of age. Ninety-seven healthy adults (age 25-90) were selected form a total of 151 recruited subjects, under strict disease exclusion criteria (see Methods). Cardiovascular age was assessed using 3 parameters: (1) aortic pulse wave velocity (PWV) (A), a measure of vascular stiffness; (2) relative wall thickness (RWT) (B), a measure of ventricular remodeling, and (3) early diastolic mitral annular velocities (e'), a measure of ventricular relaxation. In addition, the ratio of early mitral inflow velocity (E) to e', a surrogate marker of end-diastolic filling pressures (Nagueh et al., 2009; Redfield et al., 2005) was measured. Multiple regression hierarchical analysis on age-associated inflammatory markers CXCL9 and LIF and the cardiovascular aging measurements obtained from all the individuals studied (see Methods). After adjusting for age, sex, BMI, heart rate, systolic blood pressure, fasting glucose and total cholesterol to HDL ratio and at a P-value<0.01, a positive correlation is shown between CXCL9 and PWV (R=0.22) and RWT (R=0.3), and a negative correlation is observed between LIF and PWV (R=−0.27), and RWT (R=−0.22) (A and B). No variable included in the models had high co-linearity as suggested by variance inflation factors (VIF)<3 for each factor.
Figure 6B:
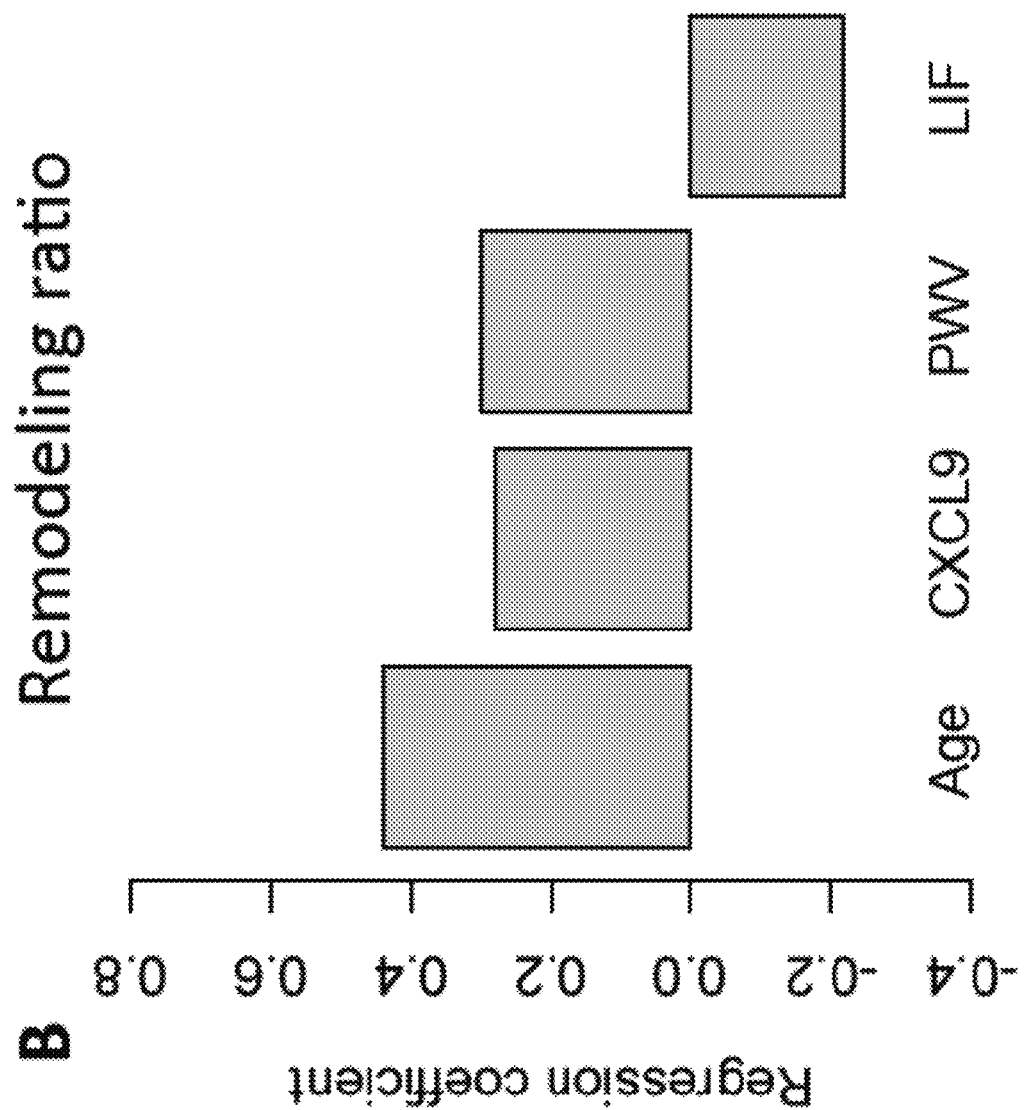

In this healthy cohort, from the 48 circulating immune proteins, only 6 were significantly correlated with age (P<0.05), among them CXCL9, IL-11Rα, CXCL10 and HGF increased with aging, while GRO-α and LIF, decreased. In contrast, there were no significant age-dependent changes in canonical acute inflammation proteins such as IL-1β ($R^2$=0.013, P=0.26), TNF-α ($R^2$=0.002, P=0.64), IL-6 ($R^2$=0.026, P=0.11), or high-sensitivity (hs)-CRP ($R^2$=0.004, P=0.56), suggesting that the increase in these markers with age likely results from an underlying pathological process associated with older age and not from aging itself. To identify inflammatory markers associated with cardiovascular aging that were independent of age and potentially present in healthy individuals, multiple regression hierarchical analysis was performed on selected inflammatory markers associated with aging in this cohort (CXCL9 and LIF) and the cardiovascular measurements obtained from all the individuals studied (see Methods). For these analyses, adjustments were made for age, sex, BMI, heart rate, systolic blood pressure, fasting glucose and total cholesterol to HDL ratio. At a P-value<0.01, a positive correlation between CXCL9 and the cardiovascular aging markers PWV (R=0.22) and RWT (R=0.3) was found, and a negative correlation between LIF and PWV (R=−0.27), and RWT (R=−0.22) (FIGS. 6A and 6B) was found. Taken together, these results show that subclinical cardiac hypertrophy and increase in arterial stiffness can be found in otherwise healthy individuals with elevated circulating CXCL9 levels and low blood concentrations of LIF.

Aging Endothelial Cells Express High Levels of CXCL9, which Induces mRNA Down-Regulation of the Cardio-Protective SIRT3

Figure 7A:
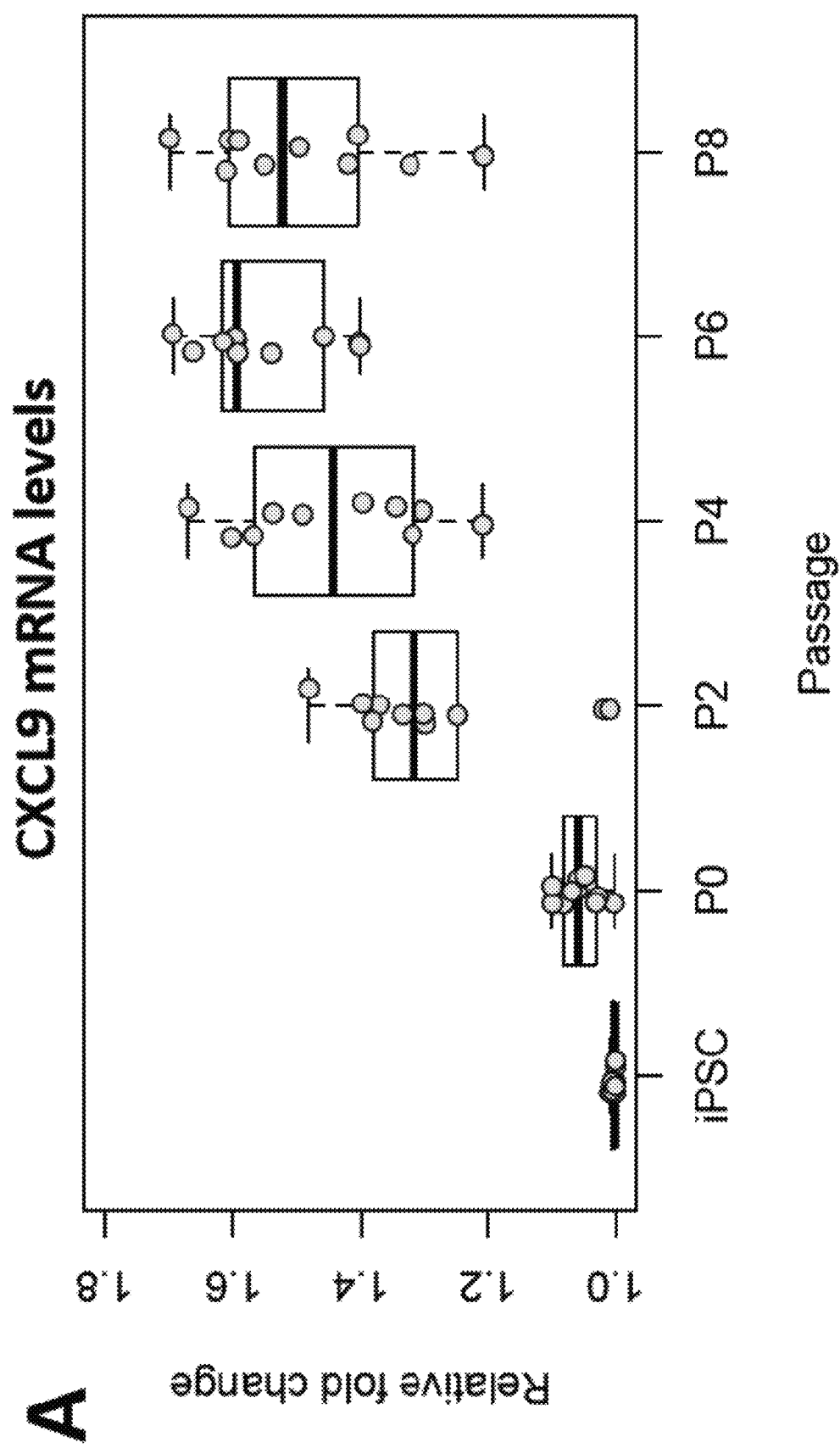
FIGS. 7A-7E depict the expression of CXCL9 and its receptor. Endothelial cells derived from hiPSC express CXCL9 and its receptor, and respond to CXCL9 by down-regulating SIRT3 levels. Induced pluripotent stem cells (hiPSCs) were obtained from isolated fibroblasts (N=5, in duplicates) using the Yamanaka factors (Takahashi and Yamanaka, 2006) and differentiated them into endothelial cells (hiPSC-ECs) under well-defined conditions as previously described (Hu et al., 2016). Expression levels of CXCL9 and SIRT3 were measured by RT-PCR as described under Methods. A significant age-dependent increase in CXCL9 mRNA expression levels is observed ($P<0.01$), which reaches a plateau after the sixth cell passage (A). Concomitant with the increase in CXCL9, down-regulation in SIRT3 mRNA can be observed after the second cell passage ($P<0.01$) (B). The reorganization stage of angiogenesis (tube formation) during hiPSC-ECs aging shows a diminished capacity of cells to form tubes in vitro (C). Addition of increasing doses (10 to 800 ng/ml) of exogenous CXCL9 to young (day 7) hiPSC-ECs induces down-regulation of SIRT3 mRNA expression (D). Expression of the CXCL9 receptor, CXCR3, was measured in young cardiomyocytes derived from hiPSCs (hiPSC-CM) as well as in hiPSC-ECs, HUVEC cells, freshly isolated fibroblasts and hiPSCs. Elevated expression is observed in hiPSC-ECs, HUVEC cells but not in other cell types (E) suggesting that the endothelium but not other cell subsets is target of CXCL9 and potentially other CXCR3 ligands as well.

Long standing evidence has suggested a critical role for the endothelium in the etiology of hypertension and arterial stiffness, and more recent work has also shown that more advanced signs of cardiovascular aging such as tissue remodeling and cardiac hypertrophy are often preceded and may be initiated by malfunctioning of aged endothelia (Castellon and Bogdanova, 2016; Harvey et al., 2015; Kamo et al., 2015). In order to study the role of CXCL9 in this process, human fibroblasts obtained from 5 donors were induced to a pluripotent stem cell (hiPSC) phenotype by using the Yamanaka factors (Takahashi and Yamanaka, 2006), and then the cells were differentiated into endothelial cells (hiPSC-ECs). To model the effect of aging, hiPSC-ECs were passaged numerous times as indicated (FIG. 7A), under well-defined conditions as previously described (Hu et al., 2016), and the mRNA expression levels of CXCL9 and SIRT3 were measured. Sirtuin-3 is an important deacetylase with cardio-protective properties involved in mitochondrial homeostasis, stem cell and tissue maintenance during aging, and linked to the beneficial effects of diet and exercise in maintaining cardiovascular health and longevity (Bonkowski and Sinclair, 2016; Lu et al., 2016).

Figure 7B:
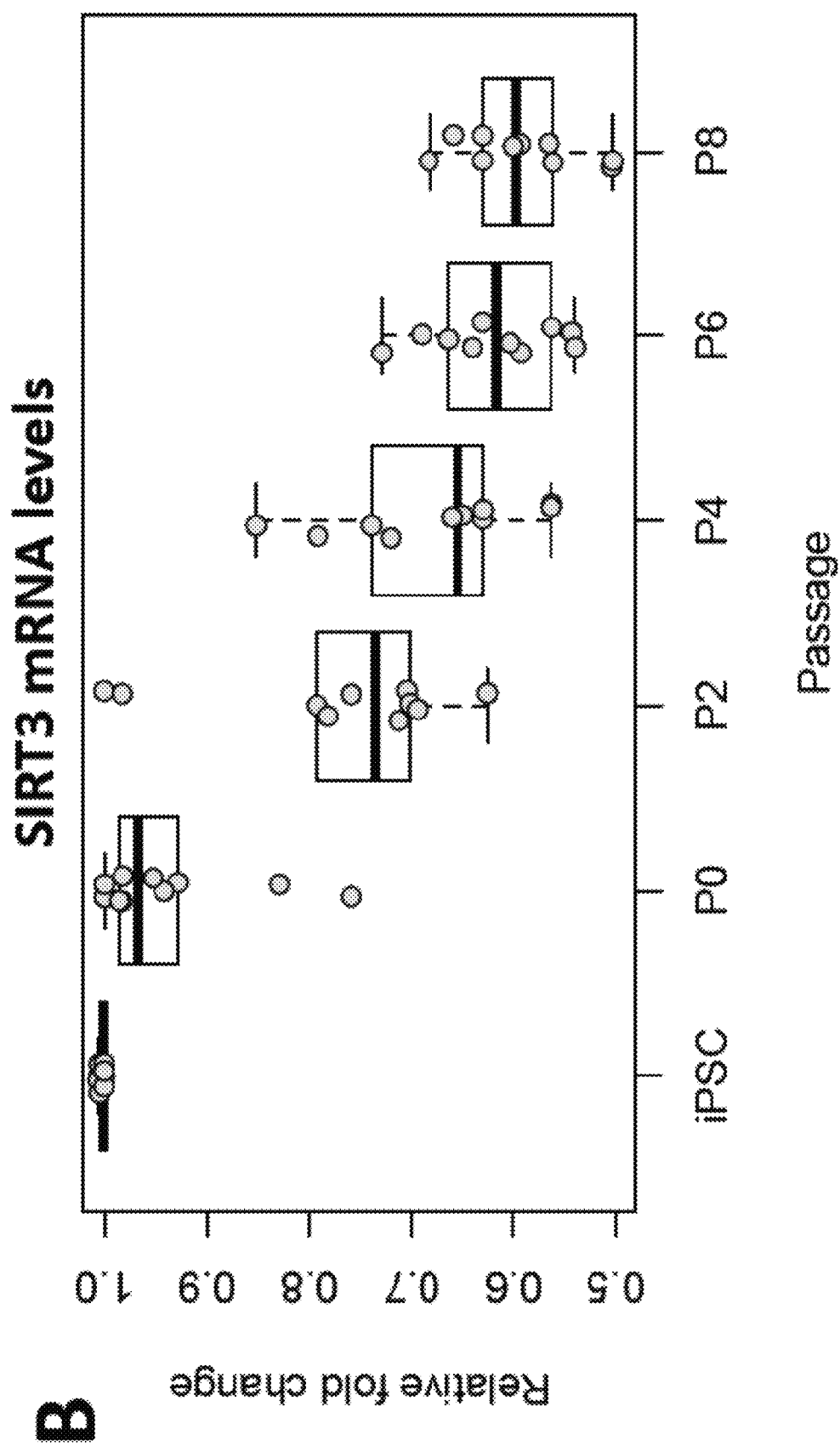
Figure 7C:
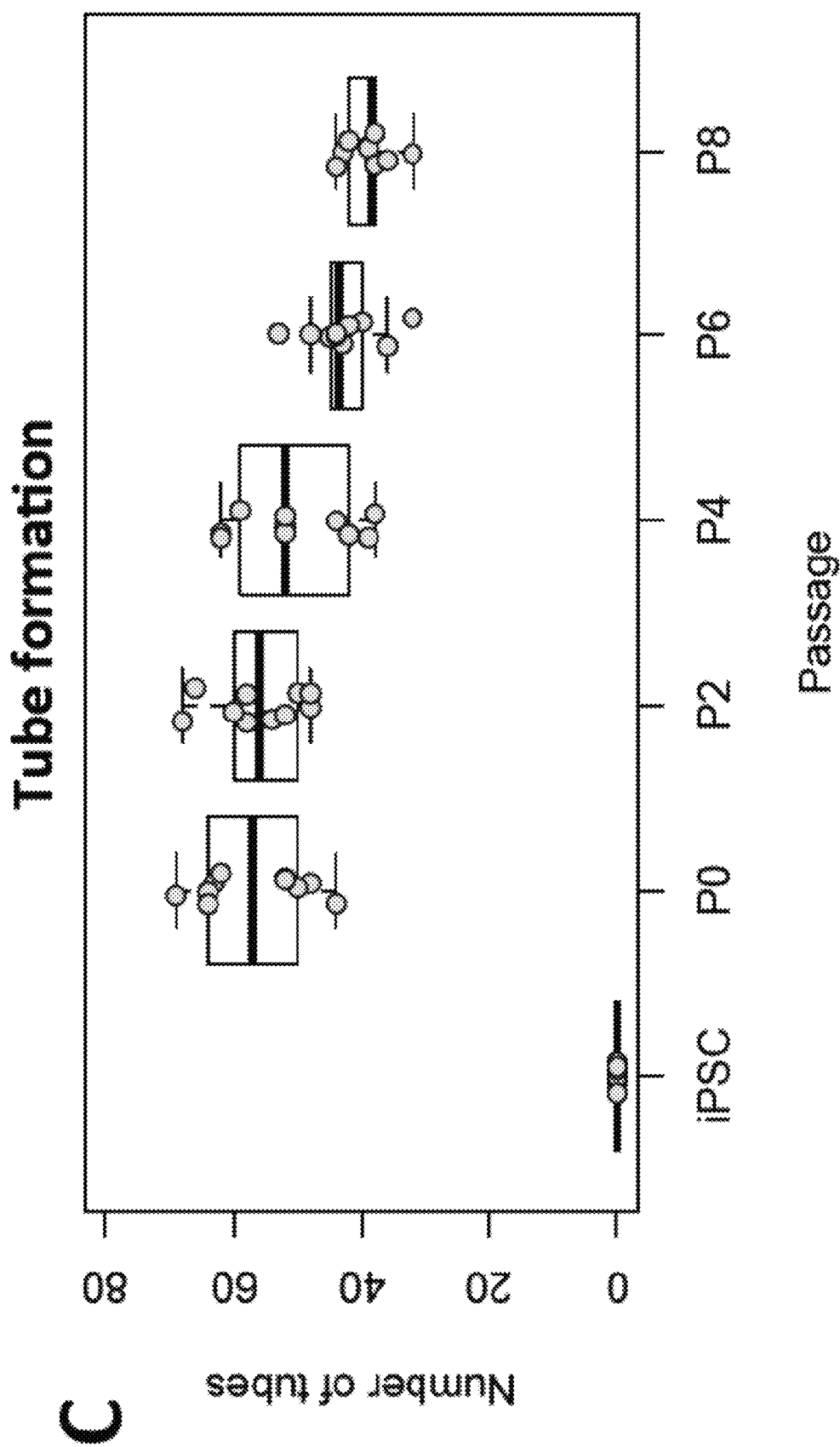
Figure 7D:
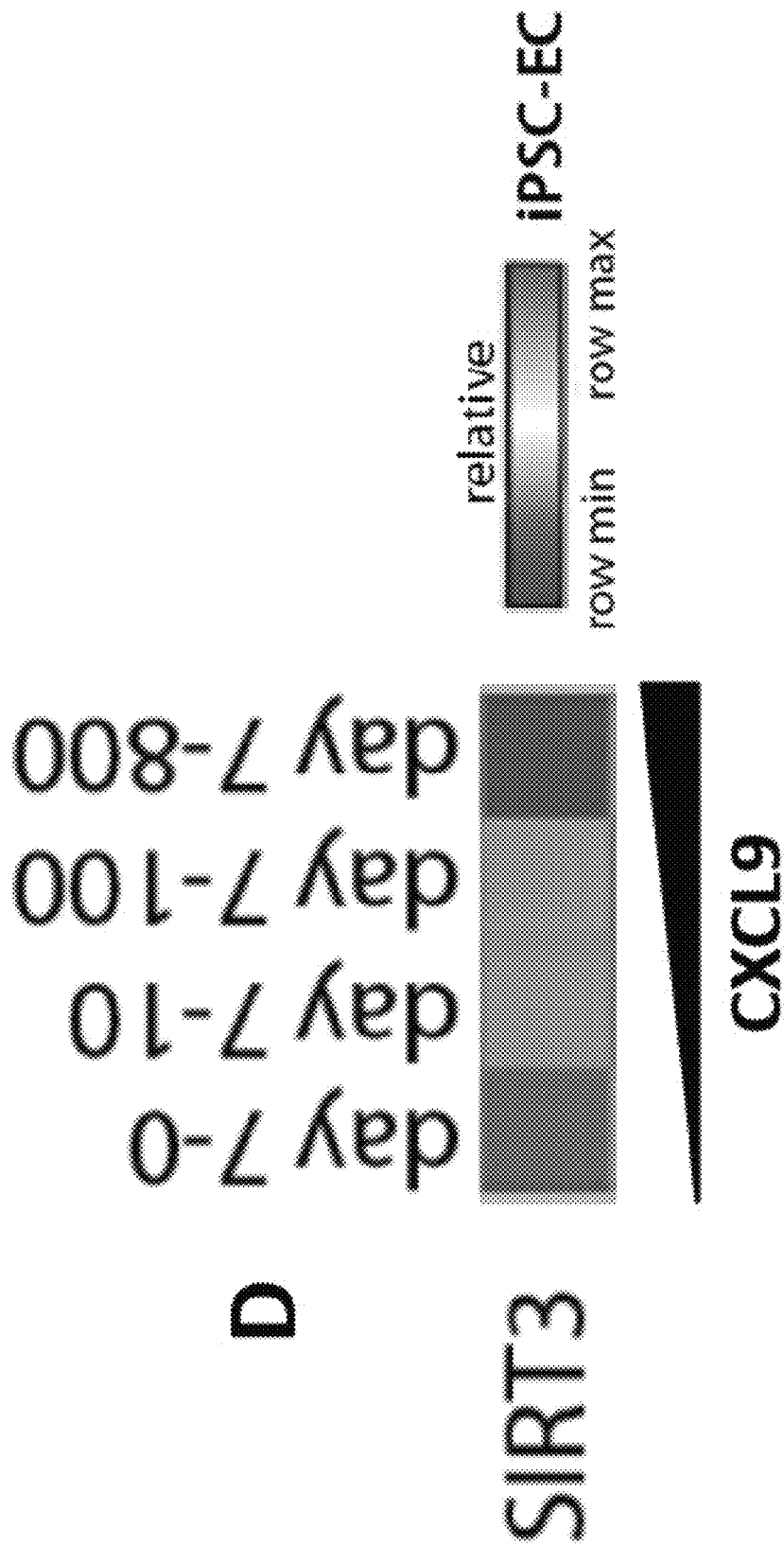
Figure 7E:
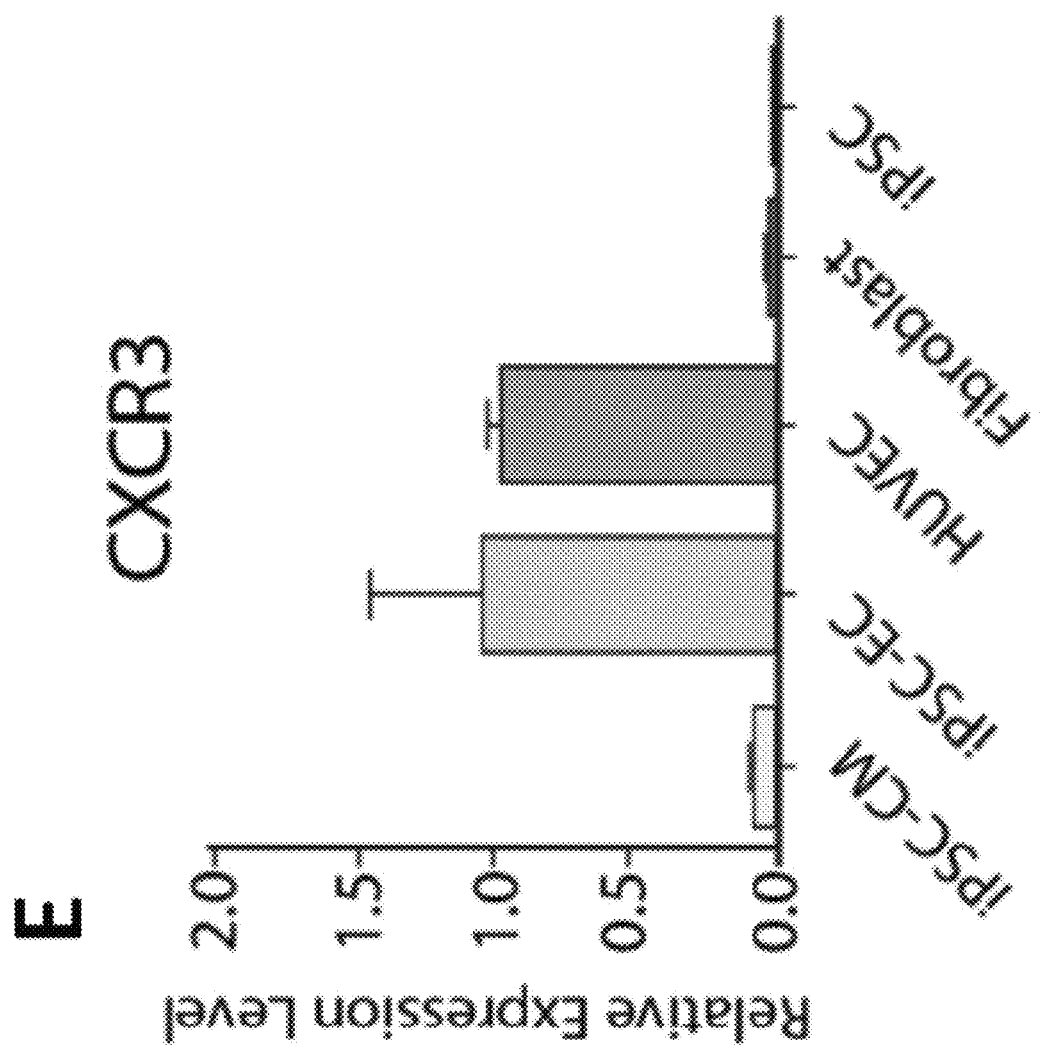

In these analyses, the reorganization stage of angiogenesis was investigated by measuring tube formation during hiPSC-ECs aging. A time-dependent increase was observed in CXCL9 transcript levels (FIG. 7A), which was concomitant with a decrease in SIRT3 expression (FIG. 7B) and a decrease in the number of vascular networks formed by the endothelial cells (FIG. 7C). Treatment of young hiPSC-ECs (at day 7) with increasing doses of CXCL9 (10 to 800 ng/mL) also down-regulated SIRT3 expression (FIG. 7D), indicating that young endothelia is a target of CXCL9 from other sources, and can down-regulate SIRT3 expression upon exposure to CXCL9. In addition, expression of the CXCL9 receptor, CXCR3 in young hiPSC-EC but not hiPSC-derived cardiomyocytes (FIG. 7E) was confirmed. These results indicate that CXCL9 can act both in a paracrine fashion, wherein increasing levels of this chemokine from immune sources affect endothelial cell function, and in an autocrine fashion on endothelial cells producing a positive feedback loop where increasing doses of CXCL9 and expression of its receptor in these cells leads to cumulative deterioration of endothelial function in aging.

Figure 8:
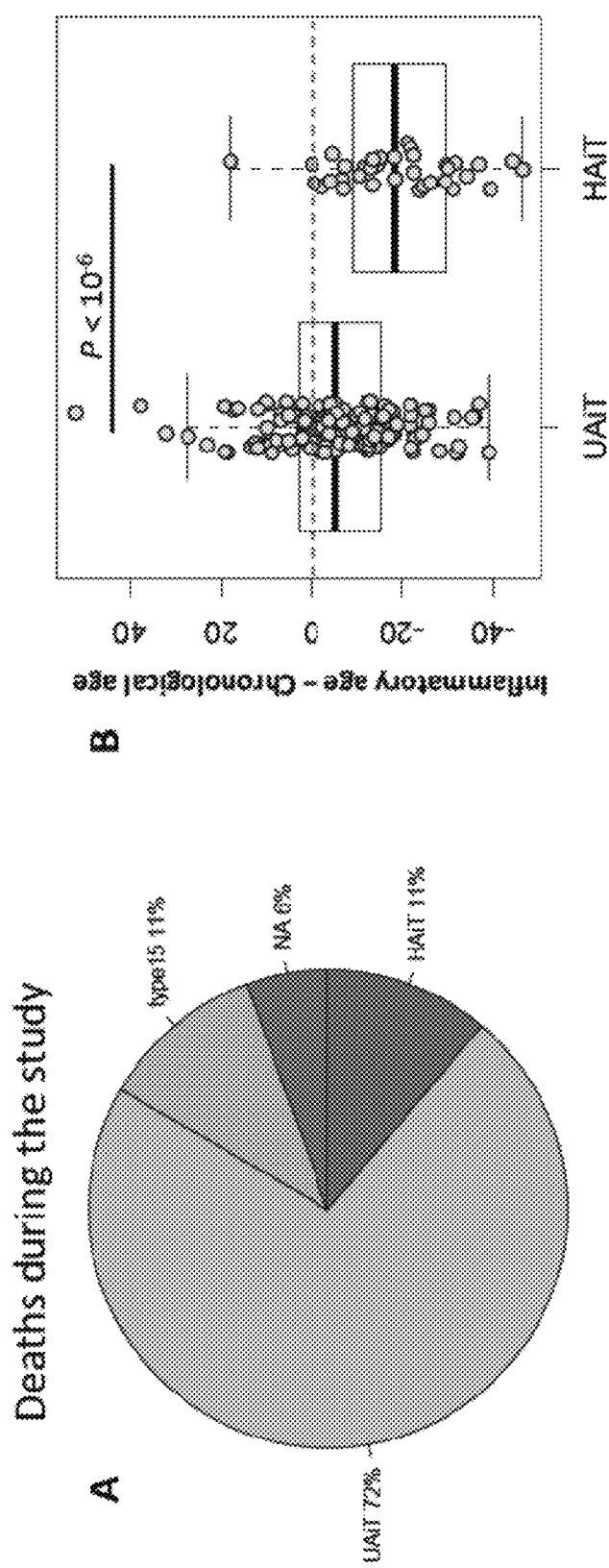
FIG. 8 depicts the mortality rate in healthy aging immunotype versus unhealthy aging immunotype. Healthy aging immunotype versus unhealthy aging immunotype have a lower mortality rate and lower SCI compared to their chronological age. A subset of the study participants (N=112) was followed longitudinally from the year 2007. From this group, 18 individuals passed away during the 9-year follow-up. The vast majority of deaths (13/18, 72%) were subjects from the UAiT group, and only 2 (11%) belonged to the HAiT group (A). Additional deaths (2/18, 11% and 1/18, 6%) were subjects from immunotype 15 and unclassified, respectively (A). A significant difference ($P<10^{-5}$, by Student's t-test) in the differential between SCI derived from the GAE method and chronological age in UAiT vs. HAiT is depicted in B.

Subjects in Healthy Aging Immunotype have a Lower Mortality Rate and a Differential SCI Vs. Chronological Age that is 13 Years Younger Compared with Those in the Unhealthy Aging Immunotype A subset of subjects from the 1KIP cohort (N=112) was part of a longitudinal study of aging that was initiated in the year 2007 (Furman et al., 2017; Shen-Orr et al., 2016) with varying number of subjects per year. A total of 18 individuals from this subgroup passed away during the 9-year follow-up. To investigate the relationship between the age-related immunotypes HAiT and UAiT and mortality, subjects age 75 and over (with known gross modifications in the immune response and an elevated risk of death) were selected. For the HAiT (immunotype 14), a total of 23 subjects were selected, of which 2 (8.6%) died during the study. For the UAiT (immunotypes 13 and 16 combined), a total of 50 subjects were in the >75-age category, of which 13 (26%) died during the course of the study (P=0.089, by Pearson's chi-squared test). Overall, the majority of deaths (13/18, 72%) occurred in subjects from the UAiT group, and only 2 (11%) were from to the HAiT group (FIG. 8A). Two (11%) deaths were subjects from immunotype 15 and an additional one death could not be classified in any immunotype, since no immune phenotyping data was available for that subject (FIG. 8A).

To investigate the relationship between SCI and the age-associated immunotypes, SCI (predicted by the GAE method) was directly compared between the two groups UAiT and HAiT using the Student's t-test and found no significant differences. However, when chronological age was subtracted from SCI (delta SCI-AGE), the HAiT group exhibited a 13 years difference compared to the UAiT group ($P<10^{-5}$, by Student's t-test) (FIG. 8B). These results demonstrate that the HAiT and UAiT status can, at least partially, predict mortality in a cohort of ambulatory individuals and that the levels of chronic inflammaging of HAiT individuals is significantly lower than their chronological age compared to the difference found in the UAiT group, suggesting that the inflammatory etiology of cardiovascular disease translates to higher mortality.

Discussion

Systemic chronic inflammaging, derived using GAE, was significantly correlated with comorbidities after adjustment for age, high cholesterol, gender and BMI. This suggests that this immune 'metric' for human health versus disease, may be used as a companion laboratory test to inform physicians about patient's inflammatory status. Not surprising was the fact that, in the smaller group of 40 older subjects who were extensively monitored for cardiovascular function, SCI also predicted cardiovascular aging as measured by arterial stiffness and cardiac hypertrophy—known to be a late clinical stage of age-related comorbidities, such as hypertension, arterial stiffness, and more generally, metabolic syndrome. A striking finding though was that in the larger cohort of 97 very healthy older individuals with no signs of disease, the major contributor to SCI, CXCL9, was positively correlated with subclinical levels of arterial stiffness and cardiac hypertrophy. These results strongly suggest that SCI can also be used as an early molecular marker for what may be a sub-clinical cardiovascular malfunctioning.

CXCL9, also known as monokine induced by gamma interferon (CXCL9), is a T-cell chemoattractant induced by IFN-γ and mostly produced by neutrophils, macrophages and endothelial cells. Despite prior data showing that CXCL9 and other CXCR3 ligands are significantly elevated in hypertension and in patients with left ventricular dysfunction (Altara et al., 2015), this is the first time that in healthy individuals, CXCL9-mediated inflammation predicts subclinical levels of cardiovascular malfunctioning. At least two sources of CXCL9-mediated inflammation can ensue with aging based on the findings; one that is age-dependent and observed in aging endothelia, and one independent of age and found in the 97-subject healthy cohort. Since endothelial cells but not cardiomyocytes expressed the CXCL9 receptor, CXCR3, it was hypothesized that this chemokine acts both in a paracrine fashion (when is produced by immune cells) and in an autocrine fashion (when is produced by the endothelium) to down-regulate SIRT3, an important stress-responsive deacetylase with cardio-protective properties involved in mitochondrial homeostasis, stem cell and tissue maintenance during aging (Bonkowski and Sinclair, 2016; Lu et al., 2016). Of the 7 SIRT proteins, SIRT3 is the only member whose increased expression has been linked to the longevity of humans (Bellizzi et al., 2005; Rose et al., 2003), but the role of this protein in cardiovascular aging was not clear until recent observations in mice lacking the SIRT3 gene, which develop spontaneous cardiac hypertrophy and fibrosis at young ages (8 weeks-old) (Guo et al., 2017). The mechanisms underlying this effect of SIRT3 in the heart are known to be dependent on mitochondrial metabolism. For example, previous work showed that the SIRT3 KO mice have altered mitochondrial fatty acid oxidation (FAO) in the heart (Alrob et al., 2014; Hirschey et al., 2010) and decreased oxidative phosphorylation complex activity and ATP production (Ahn et al., 2008). SIRT3 can also deacetylase long-chain acyl CoA dehydrogenase (LCAD), a key enzyme participating in FAO (Chen et al., 2015). It was proposed that SIRT3 plays a crucial role linking inflammation, cell metabolism, endothelial cell function and cardiovascular remodeling, which is consistent with prior work showing intricate interactions between inflammation and cell metabolism in tissue repair processes (Eming et al., 2017). More generally, it is now accepted that substantial changes in metabolism ensue with age and these may also be connected to disease phenotypes (Wiley and Campisi, 2016). Using gene expression data, it was also shown that expression of metabolic gene modules generated from 851 selected metabolism genes (Possemato et al., 2011) dramatically decrease after the age of 40 suggesting decreased metabolic plasticity—hence diminished ability to cope with sterile inflammatory triggers—after the reproductive age. Therefore, from an evolutionary perspective, chronic inflammation can be seen as an inevitable bodily energy trade-off and a consequence of shrinkage in metabolic plasticity due to aging.

The data place the endothelium as a central player in cardiovascular aging, which is in agreement with the study by Versari et al. (2009) who showed that left ventricular hypertrophy is associated with endothelial dysfunction, particularly if a concentric geometry is present (Versari et al., 2009), which was the case of the cohort (whom generally had a mass to volume ratio >1). Furthermore, it is now accepted that endothelial cells, cardiomyocytes, immune cells and fibroblasts interact in a finely-tuned highly coordinated fashion through cytokines and chemokines to maintain tissue homeostasis and proper cardiovascular function (Epelman et al., 2015). It was shown that the endothelial cell can be one source of local inflammation in the heart, but there also exist the possibility that cardiomyocytes play an important role as shown by the activation of the inflammasome NLRP3 (which induces IL-1b maturation) in experiments in mice following acute myocardial infarction (Mezzaroma et al., 2011). Last, the possibility that the adaptive immune system also participates in the hypertrophic response was suggested in nonischemic HF patients or mice with HF induced by transverse aortic constriction where T cells showed enhanced adhesion to activated vascular endothelium and T cell-deficient mice (TCRα(−/−)) had preserved left ventricular (LV) systolic and diastolic function, reduced LV fibrosis, hypertrophy and inflammation, and improved survival compared with wild-type mice (Nevers et al., 2015).

The present study significantly adds to prior work linking inflammation, cell metabolism and cardiovascular function and contributes to the understanding of human immune system variability in inflammation and in the pathogenesis of aging and cardiovascular disease.

The preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims.

REFERENCES

Ahn, B. H., Kim, H. S., Song, S., Lee, I. H., Liu, J., Vassilopoulos, A., Deng, C. X., and Finkel, T. (2008). A role for the mitochondrial deacetylase Sirt3 in regulating energy homeostasis. Proceedings of the National Academy of Sciences of the United States of America 105, 14447-14452.

Alrob, O. A., Sankaralingam, S., Ma, C., Wagg, C. S., Fillmore, N., Jaswal, J. S., Sack, M. N., Lehner, R., Gupta, M. P., Michelakis, E. D., et al. (2014). Obesity-induced lysine acetylation increases cardiac fatty acid oxidation and impairs insulin signalling. Cardiovascular research 103, 485-497.

Altara, R., Gu, Y. M., Struijker-Boudier, H. A., Thijs, L., Staessen, J. A., and Blankesteijn, W. M. (2015). Left Ventricular Dysfunction and CXCR3 Ligands in Hypertension: From Animal Experiments to a Population-Based Pilot Study. PloS one 10, e0141394.

Bektas, A., Schurman, S. H., Sen, R., and Ferrucci, L. (2017). Human T cell immunosenescence and inflammation in aging. Journal of leukocyte biology 102, 977-988.

Bellizzi, D., Rose, G., Cavalcante, P., Covello, G., Dato, S., De Rango, F., Greco, V., Maggiolini, M., Feraco, E., Mari, V., et al. (2005). A novel VNTR enhancer within the SIRT3 gene, a human homologue of SIR2, is associated with survival at oldest ages. Genomics 85, 258-263.

Bengio, Y. (2009). Learning Deep Architectures for AI. Foundations and Trends in Machine Learning: 2, 1-127.

Blazkova, J., Gupta, S., Liu, Y., Gaudilliere, B., Ganio, E. A., Bolen, C. R., Saar-Dover, R., Fragiadakis, G. K., Angst, M. S., Hasni, S., et al. (2017). Multicenter Systems Analysis of Human Blood Reveals Immature Neutrophils in Males and During Pregnancy. Journal of immunology 198, 2479-2488.

Bonkowski, M. S., and Sinclair, D. A. (2016). Slowing ageing by design: the rise of NAD+ and sirtuin-activating compounds. Nature reviews Molecular cell biology 17, 679-690.

Brodin, P., Jojic, V., Gao, T., Bhattacharya, S., Angel, C. J., Furman, D., Shen-Orr, S., Dekker, C. L., Swan, G. E., Butte, A. J., et al. (2015). Variation in the human immune system is largely driven by non-heritable influences. Cell 160, 37-47.

Castellon, X., and Bogdanova, V. (2016). Chronic Inflammatory Diseases and Endothelial Dysfunction. Aging and disease 7, 81-89.

Cavadas, C., Aveleira, C. A., Souza, G. F., and Velloso, L. A. (2016). The pathophysiology of defective proteostasis in the hypothalamus—from obesity to ageing. Nature reviews Endocrinology 12, 723-733.

Chen, T., Liu, J., Li, N., Wang, S., Liu, H., Li, J., Zhang, Y., and Bu, P. (2015). Mouse SIRT3 attenuates hypertrophy-related lipid accumulation in the heart through the deacetylation of LCAD. PloS one 10, e0118909.

Crusz, S. M., and Balkwill, F. R. (2015). Inflammation and cancer: advances and new agents. Nature reviews Clinical oncology 12, 584-596.

Dai, H., Leeder, J. S., and Cui, Y. (2014). A modified generalized Fisher method for combining probabilities from dependent tests. Frontiers in genetics 5, 32.

Desponds, J., Mora, T., and Walczak, A. M. (2016). Fluctuating fitness shapes the clone-size distribution of immune repertoires. Proceedings of the National Academy of Sciences of the United States of America 113, 274-279.

Efeyan, A., Comb, W. C., and Sabatini, D. M. (2015). Nutrient-sensing mechanisms and pathways. Nature 517, 302-310.

Eming, S. A., Wynn, T. A., and Martin, P. (2017). Inflammation and metabolism in tissue repair and regeneration. Science 356, 1026-1030.

Epelman, S., Liu, P. P., and Mann, D. L. (2015). Role of innate and adaptive immune mechanisms in cardiac injury and repair. Nature reviews Immunology 15, 117-129.

Esensten, J. H., Helou, Y. A., Chopra, G., Weiss, A., and Bluestone, J. A. (2016). CD28 Costimulation: From Mechanism to Therapy. Immunity 44, 973-988.

Fourati, S., Cristescu, R., Loboda, A., Talla, A., Filali, A., Railkar, R., Schaeffer, A. K., Favre, D., Gagnon, D., Peretz, Y., et al. (2016). Pre-vaccination inflammation and B-cell signalling predict age-related hyporesponse to hepatitis B vaccination. Nature communications 7, 10369.

Franceschi, C., and Campisi, J. (2014). Chronic inflammation (inflammaging) and its potential contribution to age-associated diseases. The journals of gerontology Series A, Biological sciences and medical sciences 69 Suppl 1, S4-9.

Franceschi, C., Garagnani, P., Vitale, G., Capri, M., and Salvioli, S. (2017). Inflammaging and 'Garb-aging'. Trends in endocrinology and metabolism: TEM 28, 199-212.

Furman, D., Chang, J., Lartigue, L., Bolen, C. R., Haddad, F., Gaudilliere, B., Ganio, E. A., Fragiadakis, G. K., Spitzer, M. H., Douchet, I., et al. (2017). Expression of specific inflammasome gene modules stratifies older individuals into two extreme clinical and immunological states. Nature medicine 23, 174-184.

Furman, D., Hejblum, B. P., Simon, N., Jojic, V., Dekker, C. L., Thiebaut, R., Tibshirani, R. J., and Davis, M. M. (2014). Systems analysis of sex differences reveals an immunosuppressive role for testosterone in the response to influenza vaccination. Proceedings of the National Academy of Sciences of the United States of America 111, 869-874.

Furman, D., Jojic, V., Kidd, B., Shen-Orr, S., Price, J., Jarrell, J., Tse, T., Huang, H., Lund, P., Maecker, H. T., et al. (2013). Apoptosis and other immune biomarkers predict influenza vaccine responsiveness. Molecular systems biology 9, 659.

Furman, D., Jojic, V., Sharma, S., Shen-Orr, S. S., Angel, C. J., Onengut-Gumuscu, S., Kidd, B. A., Maecker, H. T., Concannon, P., Dekker, C. L., et al. (2015). Cytomegalovirus infection enhances the immune response to influenza. Science translational medicine 7, 281ra243.

Goldberg, E. L., and Dixit, V. D. (2015). Drivers of age-related inflammation and strategies for healthspan extension. Immunological reviews 265, 63-74.

Grivennikov, S. I., Greten, F. R., and Karin, M. (2010). Immunity, inflammation, and cancer. Cell 140, 883-899.

Gu, M., Shao, N. Y., Sa, S., Li, D., Termglinchan, V., Ameen, M., Karakikes, I., Sosa, G., Grubert, F., Lee, J., et al. (2017). Patient-Specific iPSC-Derived Endothelial Cells Uncover Pathways that Protect against Pulmonary Hypertension in BMPR2 Mutation Carriers. Cell stem cell 20, 490-504 e495.

Guo, X., Yan, F., Li, J., Zhang, C., and Bu, P. (2017). SIRT3 attenuates AngII-induced cardiac fibrosis by inhibiting myofibroblasts transdifferentiation via STAT3-NFATc2 pathway. American journal of translational research 9, 3258-3269.

Haralambieva, I. H., Zimmermann, M. T., Ovsyannikova, I. G., Grill, D. E., Oberg, A. L., Kennedy, R. B., and Poland, G. A. (2016). Whole Transcriptome Profiling Identifies CD93 and Other Plasma Cell Survival Factor Genes Associated with Measles-Specific Antibody Response after Vaccination. PloS one 11, e0160970.

Harvey, A., Montezano, A. C., and Touyz, R. M. (2015). Vascular biology of ageing-Implications in hypertension. Journal of molecular and cellular cardiology 83, 112-121.

Hirschey, M. D., Shimazu, T., Goetzman, E., Jing, E., Schwer, B., Lombard, D. B., Grueter, C. A., Harris, C., Biddinger, S., Ilkayeva, O. R., et al. (2010). SIRT3 regulates mitochondrial fatty-acid oxidation by reversible enzyme deacetylation. Nature 464, 121-125.

Hu, S., Zhao, M. T., Jahanbani, F., Shao, N. Y., Lee, W. H., Chen, H., Snyder, M. P., and Wu, J. C. (2016). Effects of cellular origin on differentiation of human induced pluripotent stem cell-derived endothelial cells. JCI insight 1.

Hunter, R. L., Dragicevic, N., Seifert, K., Choi, D. Y., Liu, M., Kim, H. C., Cass, W. A., Sullivan, P. G., and Bing, G. (2007). Inflammation induces mitochondrial dysfunction and dopaminergic neurodegeneration in the nigrostriatal system. Journal of neurochemistry 100, 1375-1386.

Huynen, M. A., and van Nimwegen, E. (1998). The frequency distribution of gene family sizes in complete genomes. Molecular biology and evolution 15, 583-589.

Johansen, S., and Juselius, K. (1990). MAXIMUM LIKELIHOOD ESTIMATION AND INFERENCE ON COINTEGRATION WITH APPLICATIONS TO THE DEMAND FOR MONEY. Oxford Bulletin of Economics and Statistics 52, 169-210.

Jurk, D., Wilson, C., Passos, J. F., Oakley, F., Correia-Melo, C., Greaves, L., Saretzki, G., Fox, C., Lawless, C., Anderson, R., et al. (2014). Chronic inflammation induces telomere dysfunction and accelerates ageing in mice. Nature communications 2, 4172.

Kaczorowski, K. J., Shekhar, K., Nkulikiyimfura, D., Dekker, C. L., Maecker, H., Davis, M. M., Chakraborty, A. K., and Brodin, P. (2017). Continuous immunotypes describe human immune variation and predict diverse responses. Proceedings of the National Academy of Sciences of the United States of America 114, E6097-E6106.

Kamo, T., Akazawa, H., and Komuro, I. (2015). Cardiac nonmyocytes in the hub of cardiac hypertrophy. Circulation research 117, 89-98.

Kingma, D., and Jimmy, B. (2014). Adam: A method for stochastic optimization. arXiv 1412.6980.

Kotas, M. E., and Medzhitov, R. (2015). Homeostasis, inflammation, and disease susceptibility. Cell 160, 816-827.

Lang, R. M., Bierig, M., Devereux, R. B., Flachskampf, F. A., Foster, E., Pellikka, P. A., Picard, M. H., Roman, M. J., Seward, J., Shanewise, J. S., et al. (2005). Recommendations for chamber quantification: a report from the American Society of Echocardiography's Guidelines and Standards Committee and the Chamber Quantification Writing Group, developed in conjunction with the European Association of Echocardiography, a branch of the European Society of Cardiology. Journal of the American Society of Echocardiography: official publication of the American Society of Echocardiography 18, 1440-1463.

Larbi, A., and Fulop, T. (2014). From "truly naive" to "exhausted senescent" T cells: when markers predict functionality. Cytometry Part A: the journal of the International Society for Analytical Cytology 85, 25-35.

Lasry, A., and Ben-Neriah, Y. (2015). Senescence-associated inflammatory responses: aging and cancer perspectives. Trends in immunology 36, 217-228.

Li, S., Rouphael, N., Duraisingham, S., Romero-Steiner, S., Presnell, S., Davis, C., Schmidt, D. S., Johnson, S. E., Milton, A., Rajam, G., et al. (2014). Molecular signatures of antibody responses derived from a systems biology study of five human vaccines. Nature immunology 15, 195-204.

Lian, X., Hsiao, C., Wilson, G., Zhu, K., Hazeltine, L. B., Azarin, S. M., Raval, K. K., Zhang, J., Kamp, T. J., and Palecek, S. P. (2012). Robust cardiomyocyte differentiation from human pluripotent stem cells via temporal modulation of canonical Wnt signaling. Proceedings of the National Academy of Sciences of the United States of America 109, E1848-1857.

Liu, C. H., Abrams, N. D., Carrick, D. M., Chander, P., Dwyer, J., Hamlet, M. R. J., Macchiarini, F., PrabhuDas, M., Shen, G. L., Tandon, P., et al. (2017). Biomarkers of chronic inflammation in disease development and prevention: challenges and opportunities. Nature immunology 18, 1175-1180.

Lopez-Otin, C., Blasco, M. A., Partridge, L., Serrano, M., and Kroemer, G. (2013). The hallmarks of aging. Cell 153, 1194-1217.

Lu, Y., Wang, Y. D., Wang, X. Y., Chen, H., Cai, Z. J., and Xiang, M. X. (2016). SIRT3 in cardiovascular diseases: Emerging roles and therapeutic implications. International journal of cardiology 220, 700-705.

Maecker, H. T., Lindstrom, T. M., Robinson, W. H., Utz, P. J., Hale, M., Boyd, S. D., Shen-Orr, S. S., and Fathman, C. G. (2012). New tools for classification and monitoring of autoimmune diseases. Nature reviews Rheumatology 8, 317-328.

Matsa, E., Burridge, P. W., Yu, K. H., Ahrens, J. H., Termglinchan, V., Wu, H., Liu, C., Shukla, P., Sayed, N., Churko, J. M., et al. (2016). Transcriptome Profiling of Patient-Specific Human iPSC-Cardiomyocytes Predicts Individual Drug Safety and Efficacy Responses In Vitro. Cell stem cell 19, 311-325.

McKinney, E. F., Lee, J. C., Jayne, D. R., Lyons, P. A., and Smith, K. G. (2015). T-cell exhaustion, co-stimulation and clinical outcome in autoimmunity and infection. Nature 523, 612-616.

Medzhitov, R. (2008). Origin and physiological roles of inflammation. Nature 454, 428-435.

Mezzaroma, E., Toldo, S., Farkas, D., Seropian, I. M., Van Tassell, B. W., Salloum, F. N., Kannan, H. R., Menna, A. C., Voelkel, N. F., and Abbate, A. (2011). The inflammasome promotes adverse cardiac remodeling following acute myocardial infarction in the mouse. Proceedings of the National Academy of Sciences of the United States of America 108, 19725-19730.

Montoya, J. G., Holmes, T. H., Anderson, J. N., Maecker, H. T., Rosenberg-Hasson, Y., Valencia, I. J., Chu, L., Younger, J. W., Tato, C. M., and Davis, M. M. (2017). Cytokine signature associated with disease severity in chronic fatigue syndrome patients. Proceedings of the National Academy of Sciences of the United States of America 114, E7150-E7158.

Morrisette-Thomas, V., Cohen, A. A., Fulop, T., Riesco, E., Legault, V., Li, Q., Milot, E., Dusseault-Belanger, F., and Ferrucci, L. (2014). Inflamm-aging does not simply reflect increases in pro-inflammatory markers. Mechanisms of ageing and development 139, 49-57.

Nagueh, S. F., Appleton, C. P., Gillebert, T. C., Marino, P. N., Oh, J. K., Smiseth, O. A., Waggoner, A. D., Flachskampf, F. A., Pellikka, P. A., and Evangelisa, A. (2009). Recommendations for the evaluation of left ventricular diastolic function by echocardiography. European journal of echocardiography. the journal of the Working Group on Echocardiography of the European Society of Cardiology 10, 165-193.

Nakaya, H. I., Wrammert, J., Lee, E. K., Racioppi, L., Marie-Kunze, S., Haining, W. N., Means, A. R., Kasturi, S. P., Khan, N., Li, G. M., et al. (2011). Systems biology of vaccination for seasonal influenza in humans. Nature immunology 12, 786-795.

Nathan, C., and Cunningham-Bussel, A. (2013). Beyond oxidative stress: an immunologist's guide to reactive oxygen species. Nature reviews Immunology 13, 349-361.

Naumov, Y. N., Naumova, E. N., Hogan, K. T., Selin, L. K., and Gorski, J. (2003). A fractal clonotype distribution in the CD8+ memory T cell repertoire could optimize potential for immune responses. Journal of immunology 170, 3994-4001.

Nevers, T., Salvador, A. M., Grodecki-Pena, A., Knapp, A., Velazquez, F., Aronovitz, M., Kapur, N. K., Karas, R. H., Blanton, R. M., and Alcaide, P. (2015). Left Ventricular T-Cell Recruitment Contributes to the Pathogenesis of Heart Failure. Circulation Heart failure 8, 776-787.

Oh, J., Lee, Y. D., and Wagers, A. J. (2014a). Stem cell aging: mechanisms, regulators and therapeutic opportunities. Nature medicine 20, 870-880.

Oh, J. Z., Ravindran, R., Chassaing, B., Carvalho, F. A., Maddur, M. S., Bower, M., Hakimpour, P., Gill, K. P., Nakaya, H. I., Yarovinsky, F., et al. (2014b). TLR5-mediated sensing of gut microbiota is necessary for antibody responses to seasonal influenza vaccination. Immunity 41, 478-492.

Possemato, R., Marks, K. M., Shaul, Y. D., Pacold, M. E., Kim, D., Birsoy, K., Sethumadhavan, S., Woo, H. K., Jang, H. G., Jha, A. K., et al. (2011). Functional genomics reveal that the serine synthesis pathway is essential in breast cancer. Nature 476, 346-350.

Price, J. V., Jarrell, J. A., Furman, D., Kattah, N. H., Newell, E., Dekker, C. L., Davis, M. M., and Utz, P. J. (2013). Characterization of influenza vaccine immunogenicity using influenza antigen microarrays. PloS one 8, e64555.

Querec, T. D., Akondy, R. S., Lee, E. K., Cao, W., Nakaya, H. I., Teuwen, D., Pirani, A., Gernert, K., Deng, J., Marzolf, B., et al. (2009). Systems biology approach predicts immunogenicity of the yellow fever vaccine in humans. Nature immunology 10, 116-125.

Redfield, M. M., Jacobsen, S. J., Borlaug, B. A., Rodeheffer, R. J., and Kass, D. A. (2005). Age- and gender-related ventricular-vascular stiffening: a community-based study. Circulation 112, 2254-2262.

Ridker, P. M., Everett, B. M., Thuren, T., MacFadyen, J. G., Chang, W. H., Ballantyne, C., Fonseca, F., Nicolau, J., Koenig, W., Anker, S. D., et al. (2017). Antiinflammatory Therapy with Canakinumab for Atherosclerotic Disease. The New England journal of medicine 377, 1119-1131.

Rose, G., Dato, S., Altomare, K., Bellizzi, D., Garasto, S., Greco, V., Passarino, G., Feraco, E., Mari, V., Barbi, C., et al. (2003). Variability of the SIRT3 gene, human silent information regulator Sir2 homologue, and survivorship in the elderly. Experimental gerontology 38, 1065-1070.

Roskin, K. M., Simchoni, N., Liu, Y., Lee, J. Y., Seo, K., Hoh, R. A., Pham, T., Park, J. H., Furman, D., Dekker, C. L., et al. (2015). IgH sequences in common variable immune deficiency reveal altered B cell development and selection. Science translational medicine 7, 302ra135.

Shen-Orr, S. S., and Furman, D. (2013). Variability in the immune system: of vaccine responses and immune states. Current opinion in immunology 25, 542-547.

Shen-Orr, S. S., Furman, D., Kidd, B. A., Hadad, F., Lovelace, P., Huang, Y. W., Rosenberg-Hasson, Y., Mackey, S., Grisar, F. A., Pickman, Y., et al. (2016). Defective Signaling in the JAK-STAT Pathway Tracks with Chronic Inflammation and Cardiovascular Risk in Aging Humans. Cell systems 3, 374-384 e374.

Strindhall, J., Skog, M., Ernerudh, J., Bengner, M., Lofgren, S., Matussek, A., Nilsson, B. O., and Wikby, A. (2013). The inverted CD4/CD8 ratio and associated parameters in 66-year-old individuals: the Swedish HEXA immune study. Age 35, 985-991.

Subramanian, N., Torabi-Parizi, P., Gottschalk, R. A., Germain, R. N., and Dutta, B. (2015). Network representations of immune system complexity. Wiley interdisciplinary reviews Systems biology and medicine 7, 13-38.

Takahashi, K., and Yamanaka, S. (2006). Induction of pluripotent stem cells from mouse embryonic and adult fibroblast cultures by defined factors. Cell 126, 663-676.

Thevaranjan, N., Puchta, A., Schulz, C., Naidoo, A., Szamosi, J. C., Verschoor, C. P., Loukov, D., Schenck, L. P., Jury, J., Foley, K. P., et al. (2017). Age-Associated Microbial Dysbiosis Promotes Intestinal Permeability, Systemic Inflammation, and Macrophage Dysfunction. Cell host & microbe 21, 455-466 e454.

Tibshirani, R., Hastie, T., Narasimhan, B., and Chu, G. (2002). Diagnosis of multiple cancer types by shrunken centroids of gene expression. Proceedings of the National Academy of Sciences of the United States of America 99, 6567-6572.

Tibshirani, R. J., Guenther, W., and Hastie, T. (2001). Estimating the number of clusters in a data set via the gap statistic. Journal of the Royal Statistical Society: Series B (Statistical Methodology) 63, 411-423.

Versari, D., Daghini, E., Virdis, A., Ghiadoni, L., and Taddei, S. (2009). Endothelial dysfunction as a target for prevention of cardiovascular disease. Diabetes care 32 Suppl2, S314-321.

Verschoor, C. P., Lelic, A., Parsons, R., Evelegh, C., Bramson, J. L., Johnstone, J., Loeb, M. B., and Bowdish, D. M. E. (2017). Serum C-Reactive Protein and Congestive Heart Failure as Significant Predictors of Herpes Zoster Vaccine Response in Elderly Nursing Home Residents. The Journal of infectious diseases 216, 191-197.

Wang, C., Liu, Y., Xu, L. T., Jackson, K. J., Roskin, K. M., Pham, T. D., Laserson, J., Marshall, E. L., Seo, K., Lee, J. Y., et al. (2014). Effects of aging, cytomegalovirus infection, and EBV infection on human B cell repertoires. Journal of immunology 192, 603-611.

Weinstein, J. A., Jiang, N., White, R. A., 3rd, Fisher, D. S., and Quake, S. R. (2009). High-throughput sequencing of the zebrafish antibody repertoire. Science 324, 807-810.

Weng, N. P., Akbar, A. N., and Goronzy, J. (2009). CD28(−) T cells: their role in the age-associated decline of immune function. Trends in immunology 30, 306-312.

Wiley, C. D., and Campisi, J. (2016). From Ancient Pathways to Aging Cells-Connecting Metabolism and Cellular Senescence. Cell metabolism 23, 1013-1021.

Zou, H. a. H., T. (2005). Regularization and variable selection via the elastic net. Journal of Royal Statistical Society, Series B 67, 301-320.

What is claimed is:

1. A computer-implemented method of identifying an age-related chronic inflammation condition in a human subject, the method comprising:
   (a) obtaining a sample from the human subject;
   (b) measuring an amount of two or more proteins, wherein the two or more proteins are selected from a list of proteins comprising a human C-X-C motif ligand 9 (CXCL9), a human tumor necrosis factor (TNF) related apoptosis-inducing ligand (TRAIL), a human interferon gamma (IFNG), a human eosinophil chemotactic protein (EOTAXIN) and a human growth-regulated alpha protein (GROA);
   (c) inputting the measured amounts of two or more proteins into a computer and executing a non-linear transformation algorithm which is a guided auto-encoder (GAE), based on the amount of two or more proteins to determine a systemic chronic inflammaging (SCI) score, wherein the SCI score provides a predicted chronological age of the human subject based on weighted amount of the two or more proteins; and
   (d) comparing the SCI score to the human subject's chronological age, wherein a higher SCI score relative to the human subject's chronological age indicates a presence of the age-related chronic inflammation condition.

2. The method of claim 1 wherein the sample is a blood serum, a whole blood, a tissue, or a combination thereof.

3. The method of claim 1 comprising measuring the amount of said proteins in a multiplex assay.

4. The method of claim 1, further comprising:
   adjusting the SCI score based on the human subject's chronological age.

5. The method of claim 4, further comprising:
   measuring a cholesterol concentration, a gender or a body mass index (BMI) for the human subject; and
   adjusting the SCI score based on the cholesterol concentration, the gender or the BMI for the human subject.

6. The method of claim 1, wherein the proteins are measured with an enzyme-linked immunosorbent assay (ELISA).

7. The method of claim 1, wherein the proteins are measured with a western blot or a mass spectrometry.

8. The method of claim 6, wherein the ELISA is a multiplex ELISA.

9. The method of claim 1, wherein the age-related chronic inflammation condition comprises a cardiovascular disease.

10. The method of claim 1, wherein increased expression of CXCL9 and EOTAXIN are positive contributors to the SCI score.

11. The method of claim 1, wherein decreased expression of TRAIL, IFNG and GROA are negative contributors to the SCI score.

12. The method of claim 1, wherein the list of proteins further comprise interleukin-2 (IL2), transforming growth factor alpha (TGFA), plasminogen activator inhibitor-1 (PAI1), macrophage inflammatory protein-1 alpha (MIP1A), leptin, interleukin-1B (IL1B), leukemia inhibitory factor (LIF), interleukin-5 (IL5), interferon alpha (IFNA), interleukin-4 (IL4), nerve growth factor (NGF), hepatocyte growth factor (HGF), vascular endothelial growth factor (VEGF), fibroblast growth factor basic (FGFB), transforming growth factor beta (TGFB), macrophage colony stimulating factor (MCSF), platelet derived growth factor BB (PDGFBB), interleukin-7 (IL7), granulocyte macrophage colony stimulating factor (GMCSF), interleukin-12 p40 (IL12P40), interleukin-8 (IL8), skp, Cullins, F-box (SCF), granulocyte colony stimulating factor (GCSF), cluster of differentiation 40 ligand (CD40L), macrophage inflammatory protein-1 beta (MIP1B), interleukin-12 p70 (IL12P70), resistin, interferon beta (IFNB), regulated on activation normal T cell expressed and secreted (RANTES), tumor necrosis factor alpha (TNFA), monocyte chemoattractant protein 1 (MCP1), interleukin-17F (IL17F), epithelial derived neutrophil activating protein 78 (ENA78), interleukin-1 receptor antagonist (IL1RA), interleukin-10 (IL10), interferon gamma-induced protein 10 kDa (IP10), interleukin-13 (IL13), interleukin-1A (IL1A), interleukin-15 (IL15), intercellular adhesion molecule 1 (ICAM1), tumor necrosis factor B (TNFB), interleukin-6 (IL6), monocyte chemotactic protein-3 (MCP3), vascular cell adhesion molecule 1 (VCAM1), and Fas ligand (FASL).

13. The method of claim 1, wherein the list of proteins further comprises MIP1A, leptin, IL1B, IL5, IFNA, IL4, IFNB, IL2, TGFA, PAI1, and LIF.

14. The method of claim 13, wherein increased expression of CXCL9, EOTAXIN, MIP1A, leptin, IL1B, IL5, IFNA and IL4 are positive contributors to the SCI score.

15. The method of claim 13, wherein decreased expression of TRAIL, IFNB, GROA, IL2, TGFA, PAI1 and LIF are negative contributors to the SCI score.

16. A kit for measuring a systemic chronic inflammaging (SCI) of a human subject, the kit comprising:
two or more capture agents, wherein each capture agent binds to a specific protein in a sample, and wherein the specific protein is selected from the group consisting of a human C-X-C motif ligand 9 (CXCL9), a human TNF related apoptosis-inducing ligand (TRAIL), a human interferon gamma (IFNG), a human EOTAXIN and a human GROA, IL2, TGFA, PAI1, MIP1A, leptin, IL1B, LIF, IL5, IFNA, IL4, NGF, HGF, VEGF, FGFB, TGFB, MCSF, PDGFBB, IL7, GMCSF, IL12P40, IL8, SCF, GCSF, CD40L, MIP1B, IL12P70, RESISTIN, IFNB, RANTES, TNFA, MCP1, IL17F, ENA78, IL1RA, IL10, IP10, IL13, IL1A, IL15, ICAM1, TNFB, IL6, MCP3, VCAM1, and FASL; and
instructions for executing a non-linear transformation algorithm which is a guided auto-encoder (GAE), based on an amount of the protein present in the human sample to determine an SCI score, wherein the SCI score provides a predicted chronological age of the human subject based on weighted amount of the two or more proteins.

17. The kit of claim 16, wherein at least one capture agent binds to CXCL9, EOTAXIN, MIP1A, leptin, IL1B, IL5, IFNA, IL4, TRAIL, IFNB, GROA, IL2, TGFA, PAI1, or LIF.

18. The kit of claim 16, wherein at least one capture agent binds to CXCL9, TRAIL, IFNG, EOTAXIN or GROA.

19. The kit of claim 16, wherein at least one capture agent is an antibody.

* * * * *